US012476541B2

(12) United States Patent
Nakamura et al.

(10) Patent No.: US 12,476,541 B2
(45) Date of Patent: Nov. 18, 2025

(54) SOLAR CONTROLLER, METHOD, NON-TRANSITORY STORAGE MEDIUM, AND VEHICLE

(71) Applicant: TOYOTA JIDOSHA KABUSHIKI KAISHA, Toyota (JP)

(72) Inventors: Tetsuro Nakamura, Nagoya (JP); Masahiro Takahashi, Toyota (JP); Akinori Kawamura, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 803 days.

(21) Appl. No.: 17/834,363

(22) Filed: Jun. 7, 2022

(65) Prior Publication Data
US 2023/0078292 A1 Mar. 16, 2023

(30) Foreign Application Priority Data
Sep. 10, 2021 (JP) ................. 2021-147624

(51) Int. Cl.
H02J 7/35 (2006.01)
B60L 8/00 (2006.01)
H02J 7/34 (2006.01)
H02M 1/00 (2006.01)
H02M 1/32 (2007.01)
H02M 3/158 (2006.01)

(52) U.S. Cl.
CPC .......... H02M 3/1582 (2013.01); B60L 8/003 (2013.01); H02J 7/345 (2013.01); H02J 7/35 (2013.01); H02M 1/0009 (2021.05); H02M 1/32 (2013.01); B60L 2210/10 (2013.01); H02J 2207/20 (2020.01); H02J 2300/24 (2020.01)

(58) Field of Classification Search
USPC ....... 320/100, 101, 102, 103, 104, 105, 106, 320/107, 108
See application file for complete search history.

(56) References Cited

U.S. PATENT DOCUMENTS

2018/0152014 A1   5/2018   Miyoshi et al.
2020/0169216 A1*  5/2020   Han ................. H02M 3/33576

FOREIGN PATENT DOCUMENTS

JP   2018-093559 A   6/2018
JP   2018-133905 A   8/2018

* cited by examiner

Primary Examiner — Brian Ngo
(74) Attorney, Agent, or Firm — Oliff PLC

(57) ABSTRACT

A solar controller is configured to control a solar unit including a solar panel, a step-up and step-down DC-DC converter configured to receive electric power generated by the solar panel, convert the received electric power to a predetermined electric power, and output the predetermined electric power, and a regulator circuit provided between an output of the DC-DC converter and a ground potential. The solar controller includes one or more processors are configured to: acquire an input and output voltages of the DC-DC converter; acquire an input and output currents of the DC-DC converter; control the regulator circuit and a plurality of switching elements that respectively make up a plurality of arms included in the DC-DC converter; and determine whether an abnormality in each of the arms has occurred based on the input and output voltages or the input and output currents, that is acquired.

13 Claims, 16 Drawing Sheets

| PROCESS | STEP-DOWN | | STEP-UP | | SHORT CIRCUIT | DIS-CHARGE |
|---|---|---|---|---|---|---|
| | M1 | M2 | M3 | D4 | M5 | M6 |
| OUTPUT VOLTAGE DISCHARGE | OFF | OFF | OFF | — | OFF | ON |
| STEP-DOWN UPPER ARM SHORT-CIRCUIT FAULT DETERMINATION | OFF | OFF | OFF | — | OFF | ON |

| PROCESS | STEP-DOWN | | STEP-UP | | SHORT CIRCUIT | DIS-CHARGE |
|---|---|---|---|---|---|---|
| | M1 | M2 | M3 | D4 | M5 | M6 |
| SOLAR PANEL VOLTAGE DETERMINATION | OFF | OFF | OFF | — | ON | ON |
| STEP-DOWN AND STEP-UP UPPER ARM OPEN-CIRCUIT FAULT DETERMINATION | ON | OFF | OFF | — | ON | ON |

| PROCESS | STEP-DOWN | | STEP-UP | | SHORT CIRCUIT | DIS-CHARGE |
|---|---|---|---|---|---|---|
| | M1 | M2 | M3 | D4 | M5 | M6 |
| STEP-DOWN AND STEP-UP LOWER ARM SHORT-CIRCUIT FAULT DETERMINATION | ON | OFF | OFF | — | ON | ON |

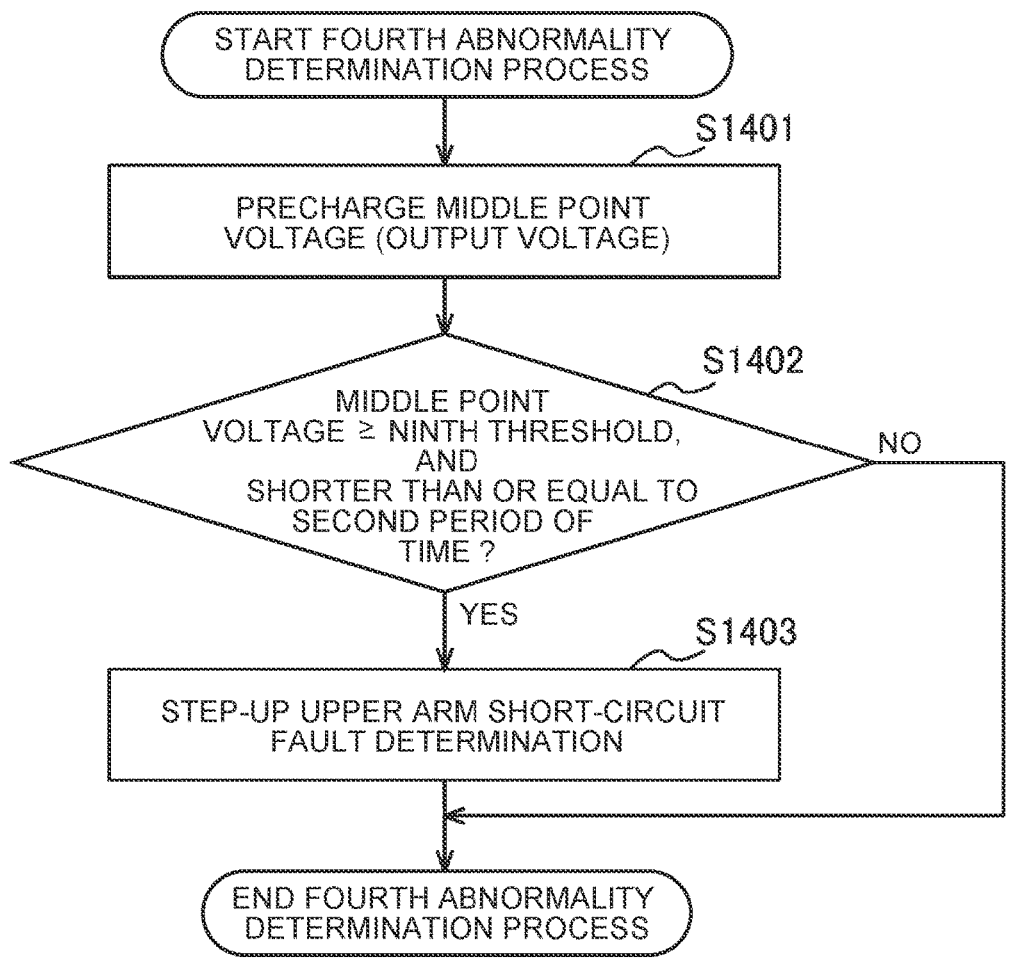

FIG. 19

| ABNORMALITY DETERMINATION | PROCESS | STEP-DOWN | | STEP-UP | | SHORT-CIRCUIT | DIS-CHARGE |
|---|---|---|---|---|---|---|---|
| | | M1 | M2 | M3 | M4 | M5 | M6 |
| FIRST | OUTPUT VOLTAGE DISCHARGE | OFF | OFF | OFF | OFF | OFF | ON |
| | STEP-DOWN UPPER ARM SHORT-CIRCUIT FAULT DETERMINATION | OFF | OFF | OFF | OFF | OFF | ON |
| | SOLAR PANEL VOLTAGE DETERMINATION | OFF | OFF | OFF | OFF | ON | ON |
| SECOND | STEP-DOWN AND STEP-UP UPPER ARM OPEN-CIRCUIT FAULT DETERMINATION | ON | OFF | OFF | OFF | ON | ON |
| | STEP-DOWN AND STEP-UP LOWER ARM SHORT-CIRCUIT FAULT DETERMINATION | ON | OFF | OFF | OFF | ON | ON |
| THIRD | OUTPUT VOLTAGE PRECHARGE | ON | OFF | ON | OFF | OFF | OFF |
| FOURTH | STEP-UP UPPER ARM SHORT-CIRCUIT FAULT DETERMINATION | OFF | OFF | OFF | OFF | OFF | OFF |

FIG. 21

| ABNORMALITY DETERMINATION | PROCESS | STEP-DOWN | | STEP-UP | | SHORT CIRCUIT | DISCHARGE |
|---|---|---|---|---|---|---|---|
| | | M1 | D2 | M3 | D4 | M5 | M6 |
| FIRST | OUTPUT VOLTAGE DISCHARGE | OFF | — | OFF | — | OFF | ON |
| | STEP-DOWN UPPER ARM SHORT-CIRCUIT FAULT DETERMINATION | OFF | — | OFF | — | OFF | ON |
| SECOND | SOLAR PANEL VOLTAGE DETERMINATION | OFF | — | OFF | — | ON | ON |
| | STEP-DOWN AND STEP-UP UPPER ARM OPEN-CIRCUIT FAULT DETERMINATION | ON | — | OFF | — | ON | ON |
| | STEP-DOWN AND STEP-UP LOWER ARM SHORT-CIRCUIT FAULT DETERMINATION | ON | — | OFF | — | ON | ON |
| THIRD | OUTPUT VOLTAGE PRECHARGE | ON | — | OFF | — | OFF | OFF |
| FOURTH | STEP-UP UPPER ARM SHORT-CIRCUIT FAULT DETERMINATION | OFF | — | ON | — | OFF | OFF |

FIG. 23

| ABNORMALITY DETERMINATION | PROCESS | FIRST SOLAR DDC | | | | | | SECOND SOLAR DDC | | | | | | SHORT CIRCUIT | DIS-CHARGE |
|---|---|---|---|---|---|---|---|---|---|---|---|---|---|---|---|
| | | STEP-DOWN | | STEP-UP | | STEP-UP | | STEP-DOWN | | STEP-UP | | STEP-UP | | | |
| | | M1 | M2 | M3 | D4 | M1 | M2 | M3 | D4 | M5 | M6 |
| FIRST | OUTPUT VOLTAGE DISCHARGE | OFF | OFF | OFF | — | OFF | OFF | OFF | — | OFF | ON |
| FIRST | STEP-DOWN UPPER ARM SHORT-CIRCUIT FAULT DETERMINATION | OFF | OFF | OFF | — | OFF | OFF | OFF | — | OFF | ON |
| SECOND | SOLAR PANEL VOLTAGE DETERMINATION | OFF | OFF | OFF | — | OFF | OFF | OFF | — | ON | ON |
| SECOND | STEP-DOWN AND STEP-UP UPPER ARM OPEN-CIRCUIT FAULT DETERMINATION | ON | OFF | OFF | — | ON | OFF | OFF | — | ON | ON |
| SECOND | STEP-DOWN AND STEP-UP LOWER ARM SHORT-CIRCUIT FAULT DETERMINATION | ON | OFF | OFF | — | ON | OFF | OFF | — | ON | ON |
| THIRD | OUTPUT VOLTAGE PRECHARGE | ON | OFF | ON | — | OFF | OFF | ON | — | OFF | OFF |
| FOURTH | STEP-UP UPPER ARM SHORT-CIRCUIT FAULT DETERMINATION | OFF | OFF | OFF | — | OFF | OFF | ON | — | OFF | OFF |

SOLAR CONTROLLER, METHOD, NON-TRANSITORY STORAGE MEDIUM, AND VEHICLE

CROSS-REFERENCE TO RELATED APPLICATION

This application claims priority to Japanese Patent Application No. 2021-147624 filed on Sep. 10, 2021, incorporated herein by reference in its entirety.

BACKGROUND

1. Technical Field

The disclosure relates to a solar controller, a method, a non-transitory storage medium, and a vehicle.

2. Description of Related Art

Japanese Unexamined Patent Application Publication No. 2018-093559 (JP 2018-093559 A) describes an apparatus that, in a DC-DC converter using electric power generated by a solar panel as input, detects whether there is a short-circuit fault in each of elements (switching elements and rectifier elements) that respectively make up arms of the DC-DC converter.

SUMMARY

With a determining method used by the apparatus described in JP 2018-093559 A, whether there is an abnormality is determined even when electric power generated by the solar panel is small due to a reduction in the amount of solar radiation, so erroneous determination may be made as to whether there is a short-circuit fault in each of the elements that respectively make up the arms of the DC-DC converter.

With the determining method used by the apparatus described in JP 2018-093559 A, it is possible to determine whether there is an abnormality caused by a short-circuit fault in each of the elements that respectively make up the arms of the DC-DC converter; however, it is not possible to determine whether there is an abnormality caused by an open circuit fault in each of these elements.

The disclosure provides a solar controller, a method, a non-transitory storage medium, and a vehicle that are capable of determining whether there is an abnormality, that is, a short-circuit fault or an open circuit fault, in each of arms of a DC-DC converter while avoiding erroneous determination due to a decrease in the amount of solar radiation.

An aspect of the disclosure provides a solar controller. A solar controller is configured to control a solar unit. The solar unit includes a solar panel, a DC-DC converter that is a step-up and step-down type and is configured to receive electric power generated by the solar panel, convert the received electric power to a predetermined electric power, and output the predetermined electric power, and a regulator circuit provided between an output of the DC-DC converter and a ground potential. The solar controller includes one or more processors configured to: acquire an input voltage and an output voltage of the DC-DC converter; acquire an input current and an output current of the DC-DC converter; control the regulator circuit and a plurality of switching elements that respectively make up a plurality of arms included in the DC-DC converter; and determine whether an abnormality in each of the arms has occurred based on i) the input voltage and the output voltage or ii) the input current and the output current, that is acquired.

A second aspect of the disclosure provides a method that is executed by a solar controller. The solar controller is configured to control a solar unit including a solar panel, a DC-DC converter that is a step-up and step-down type and is configured to receive electric power generated by the solar panel, convert the received electric power to a predetermined electric power, and output the predetermined electric power, and a regulator circuit provided between an output of the DC-DC converter and a ground potential. The method includes acquiring input and output voltages of the DC-DC converter; acquiring input and output currents of the DC-DC converter; controlling the regulator circuit and a plurality of switching elements that respectively make up a plurality of arms included in the DC-DC converter; and determining whether an abnormality in each of the arms has occurred based on the input and output voltages or the input and output currents.

A third aspect of the disclosure provides a non-transitory storage medium. The non-transitory storage medium stores instructions that are executable by a computer of a solar controller and cause the computer to perform functions. The solar controller is configured to control a solar unit including a solar panel, a DC-DC converter that is a step-up and step-down type and is configured to receive electric power generated by the solar panel, convert the received electric power to a predetermined electric power, and output the predetermined electric power, and a regulator circuit provided between an output of the DC-DC converter and a ground potential. The functions includes: acquiring input and output voltages of the DC-DC converter; acquiring input and output currents of the DC-DC converter; controlling the regulator circuit and a plurality of switching elements that respectively make up a plurality of arms included in the DC-DC converter; and determining whether an abnormality in each of the arms has occurred based on the input and output voltages or the input and output currents.

A fourth aspect of the disclosure provides a vehicle including the above-described solar controller.

With the solar controller, method, non-transitory storage medium, and vehicle of the aspects of the disclosure, it is possible to suitably determine whether there is an abnormality, that is, a short-circuit fault or an open circuit fault, in each of arms of a DC-DC converter while avoiding erroneous determination due to a decrease in the amount of solar radiation.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 14 is a flowchart illustrating a fourth abnormality determination process that is executed by the solar controller;

FIG. 15 is a table showing the statuses of the switching elements of the solar DDC and the regulator circuit in the fourth abnormality determination process;

FIG. 19 is a table showing the statuses of the switching elements of the solar DDC of the first modification and the regulator circuit in the first to fourth abnormality determination processes;

FIG. 21 is a table showing the statuses of the switching elements of the solar DDC of the second modification and the regulator circuit in the first to fourth abnormality determination processes;

FIG. 23 is a table showing the statuses of the switching elements of solar DDCs and the regulator circuit of the solar unit of the application example in the first to fourth abnormality determination processes.

DETAILED DESCRIPTION OF EMBODIMENTS

A solar controller according to the disclosure determines whether there is a short-circuit fault or an open circuit fault of each of a step-down upper arm, a step-down lower arm, a step-up upper arm, and a step-up lower arm that make up a DC-DC converter by using values of input and output voltages and input and output currents of the DC-DC converter and a large-capacitance capacitor connected to an output side of the DC-DC converter. Hereinafter, an embodiment of the disclosure will be described in detail with reference to the accompanying drawings.

Embodiment

Configuration

Figure 1:
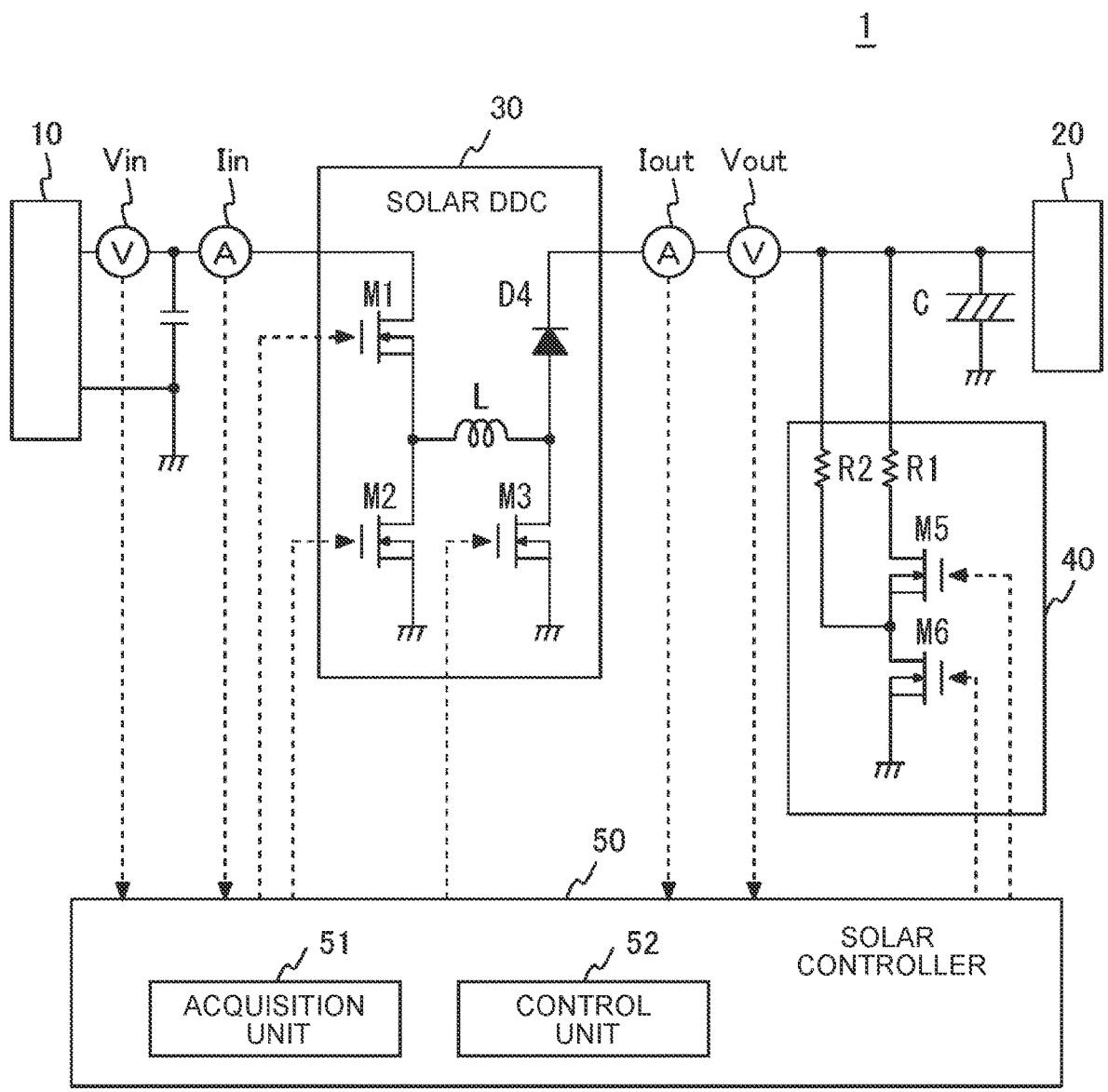
FIG. 1 is a block diagram showing the schematic configuration of a solar unit including a solar controller according to an embodiment of the disclosure.

FIG. 1 is a block diagram showing the schematic configuration of a solar unit including a solar controller according to the embodiment of the disclosure. The solar unit 1 illustrated in FIG. 1 includes a solar panel 10, an output circuit 20, a solar DDC 30, a regulator circuit 40, the solar controller 50 of the present embodiment, an input voltage detection unit Vin, an input current detection unit Iin, an output voltage detection unit Vout, an output current detection unit Iout, and a capacitor C. In FIG. 1, connection lines through which electric power is transmitted or received are represented by continuous lines, and connection lines through which control instructions, detected values, and the like are communicated are represented by dashed lines. The solar unit 1 may be mounted on a vehicle or the like.

The solar panel 10 is a power generation apparatus that generates electric power upon receiving irradiation with sunlight and is typically a solar cell module that is a collection of solar cells. The solar panel 10 may be installed on, for example, a roof, or the like, of a vehicle. The solar panel 10 is connected to the solar DDC 30 (described later), and electric power generated by the solar panel 10 is output to the solar DDC 30.

The input voltage detection unit Vin is, for example, a voltage sensor. The input voltage detection unit Vin is provided to detect a voltage output from the solar panel 10 to the solar DDC 30, that is, a voltage input to the solar DDC 30, according to a generated electric power. The input voltage of the solar DDC 30, detected by the input voltage detection unit Vin, is output to the solar controller 50.

The input current detection unit Iin is, for example, a current sensor. The input current detection unit Iin is provided to detect a current output from the solar panel 10 to the solar DDC 30, that is, a current input to the solar DDC 30, according to a generated electric power. The input current of the solar DDC 30, detected by the input current detection unit Iin, is output to the solar controller 50.

The output circuit 20 includes components that are supplied with electric power output from the solar DDC 30. Examples of the output circuit 20 include a high-voltage DC-DC converter and an auxiliary DC-DC converter. The high-voltage DC-DC converter supplies electric power to a high-voltage battery or the like (not shown) that is a secondary battery, such as a lithium ion battery. The auxiliary DC-DC converter supplies electric power to an auxiliary battery that is a secondary battery, such as a lead storage battery, an auxiliary system, and the like (not shown).

The output voltage detection unit Vout is, for example, a voltage sensor. The output voltage detection unit Vout is provided to detect a voltage output from the solar DDC 30 to the output circuit 20. The voltage detected by the output voltage detection unit Vout is a voltage at a connection point (hereinafter, referred to as "middle point") at which the output side of the solar DDC 30 is connected to the input side of the output circuit 20 (the high-voltage DC-DC converter, the auxiliary DC-DC converter, and the like). The output voltage of the solar DDC 30, detected by the output voltage detection unit Vout, is output to the solar controller 50.

The output current detection unit Iout is, for example, a current sensor. The output current detection unit Iout is provided to detect a current output from the solar DDC 30 to the output circuit 20. The output current of the solar DDC 30, detected by the output current detection unit Iout, is output to the solar controller 50.

The capacitor C is connected to a middle point between the solar DDC 30 and the output circuit 20 (the high-voltage DC-DC converter, the auxiliary DC-DC converter, and the like). The capacitor C is a large-capacitance capacitor capable of storing electric power and used to, where necessary, charge or discharge electric power generated by the solar panel 10 and output from the solar DDC 30 and stabilize the voltage at the middle point.

The solar DDC 30 is a step-up and step-down DC-DC converter that supplies the output circuit 20 with electric power generated by the solar panel 10. When the solar DDC 30 supplies electric power, the solar DDC 30 is capable of converting (stepping up or stepping down) the voltage generated by the solar panel 10, which is an input voltage, to a predetermined voltage and outputting the predetermined voltage to the output circuit 20. The solar DDC 30 includes a switching element M1 that is the element of a step-down upper arm, a switching element M2 that is the element of a step-down lower arm, an inductor L, a switching element M3 that is the element of a step-up lower arm, and a rectifier element D4 that is the element of a step-up upper arm.

The switching elements M1, M2, M3 are active elements able to be subjected to ON/OFF switching control by the solar controller 50 and are, for example, transistors. The switching elements M1, M2, M3 each are able to pass current during ON control (when an ON voltage is applied to the gate). For example, a metal oxide semiconductor field effect transistor (MOSFET) may be used as the transistor. The rectifier element D4 is an active element able to pass current in one direction and is, for example, a diode. For example, a schottky-barrier diode may be used as the diode. The inductor L is a passive element capable of generating a magnetic field by using passage current and storing magnetic energy. The inductor L has a constant-current characteristic of trying to maintain a current. For example, a choke coil may be used as the inductor L.

The source of the switching element M1 is connected to the solar panel 10 (positive output terminal). The drain of the switching element M1 is connected to the source of the switching element M2. The drain of the switching element M2 is grounded (ground potential). The cathode of the rectifier element D4 is connected to the output circuit 20 and the regulator circuit 40. The anode of the rectifier element D4 is connected to the source of the switching element M3. The drain of the switching element M3 is grounded. Each of the gates of the switching elements M1, M2, M3 is connected to the solar controller 50. The inductor L is inserted between a connection point of the drain of the switching element M1 with the source of the switching element M2 and a connection point of the anode of the rectifier element D4 with the source of the switching element M3.

The solar DDC 30 provides a step-down circuit made up of the switching element M1, the switching element M2, and the inductor L and is capable of stepping down an output voltage from the solar panel 10 and outputting the voltage to the output circuit 20. The solar DDC 30 provides a step-up circuit made up of the inductor L, the switching element M3, and the rectifier element D4 and is capable of stepping up an output voltage from the solar panel 10 and outputting the voltage to the output circuit 20. The solar DDC 30, the solar panel 10, and the regulator circuit 40 (described later) make up the solar unit. The regulator circuit 40 may be provided in a device other than the solar unit.

The regulator circuit 40 is a circuit that regulates the voltage at the middle point at which the solar DDC 30 and the output circuit 20 are connected. The regulator circuit 40 is inserted (provided) between the output side of the solar DDC 30 and the ground potential. The regulator circuit 40 includes a resistance R1, a resistance R2, a switching element M5, and a switching element M6.

The switching elements M5, M6 are active elements able to be subjected to ON/OFF switching control by the solar controller 50 and are, for example, transistors. The switching elements M5, M6 each are able to pass current during ON control. For example, a MOSFET may be used as the transistor. The resistance R1 is inserted between the middle point and the source of the switching element M5 of which the drain is connected to the source of the switching element M6 of which the drain is grounded. When each of the switching element M5 and the switching element M6 is controlled to an ON state, a short-circuit path from the middle point through the resistance R1 is formed. The resistance R2 is inserted between the middle point and the source of the switching element M6 of which the drain is grounded. When the switching element M5 is controlled to an OFF state (an OFF voltage is applied to the gate) and the switching element M6 is controlled to an ON state, a discharge path of the middle point voltage through the resistance R2 is formed. Thus, the short-circuit resistance R1 is set so as to be less than the discharge resistance R2. For example, the resistance R1 may be set to 0.05Ω, and the resistance R2 may be set to 100Ω.

The solar controller 50 includes at least an acquisition unit 51 and a control unit 52. The acquisition unit 51 acquires the detected values of voltage and current respectively from the input voltage detection unit Vin, the input current detection unit Iin, the output voltage detection unit Vout, and the output current detection unit Tout. The control unit 52 controls the gate voltages of the switching elements M1, M2, M3 of the solar DDC 30 and the switching elements M5, M6 of the regulator circuit 40 to control ON/OFF switching of each switching element. One or some or all of the input voltage detection unit Vin, the input current detection unit Iin, the output voltage detection unit Vout, and the output current detection unit Iout may be configured in the solar controller 50.

The solar controller 50 according to the present embodiment appropriately controls the ON/OFF status of each switching element to execute a process of determining whether there is an abnormality in each of the arms (the element that makes up each of the arms) of the solar DDC 30 based on the values of input and output voltages and input and output currents of the solar DDC 30, obtained from the results of the control. The details of abnormality determination processes that are executed by the solar controller 50 will be described later.

Part or all of the solar controller 50 can be made up of an electronic control unit (ECU) that typically includes a processor, a memory, an input and output interface, and the like. The electronic control unit is capable of executing various controls by the processor reading programs stored in the memory and running the programs. The number of electronic control units that can make up part or all of the solar controller 50 is not limited to one.

Abnormality Determination Control

Next, abnormality determination control that is executed by the solar controller 50 will be described further with reference to FIG. 2 to FIG. 17. The solar controller 50 according to the present embodiment executes processes of "first abnormality determination" for determining a short-circuit fault of the step-down upper arm, "second abnormality determination" for determining an open circuit fault of the step-down upper arm and the step-up upper arm, "third abnormality determination" for determining a short-circuit fault of the step-down lower arm and the step-up lower arm, and "fourth abnormality determination" for determining a short-circuit fault of the step-up upper arm. The abnormality determination processes are typically executed before the solar charging system that includes the solar unit 1 and the battery (not shown) is activated and power generation and charging control is started (the solar DDC 30 starts up).

(1) First Abnormality Determination Process

Figures 2, 3:
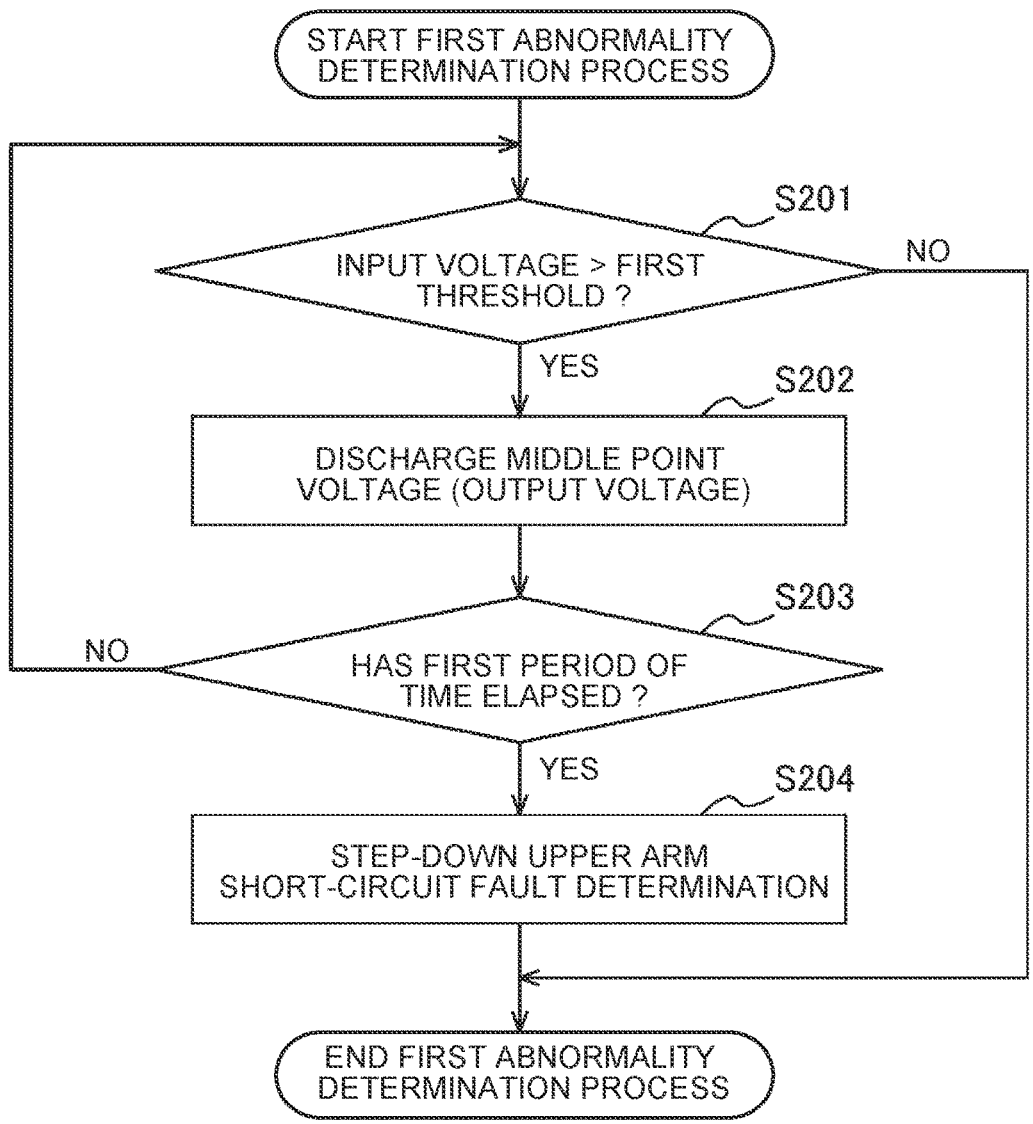
FIG. 2 is a flowchart illustrating a first abnormality determination process that is executed by the solar controller.
FIG. 3 is a table showing the statuses of switching elements of a solar DDC and a regulator circuit in the first abnormality determination process.
Figure 4:
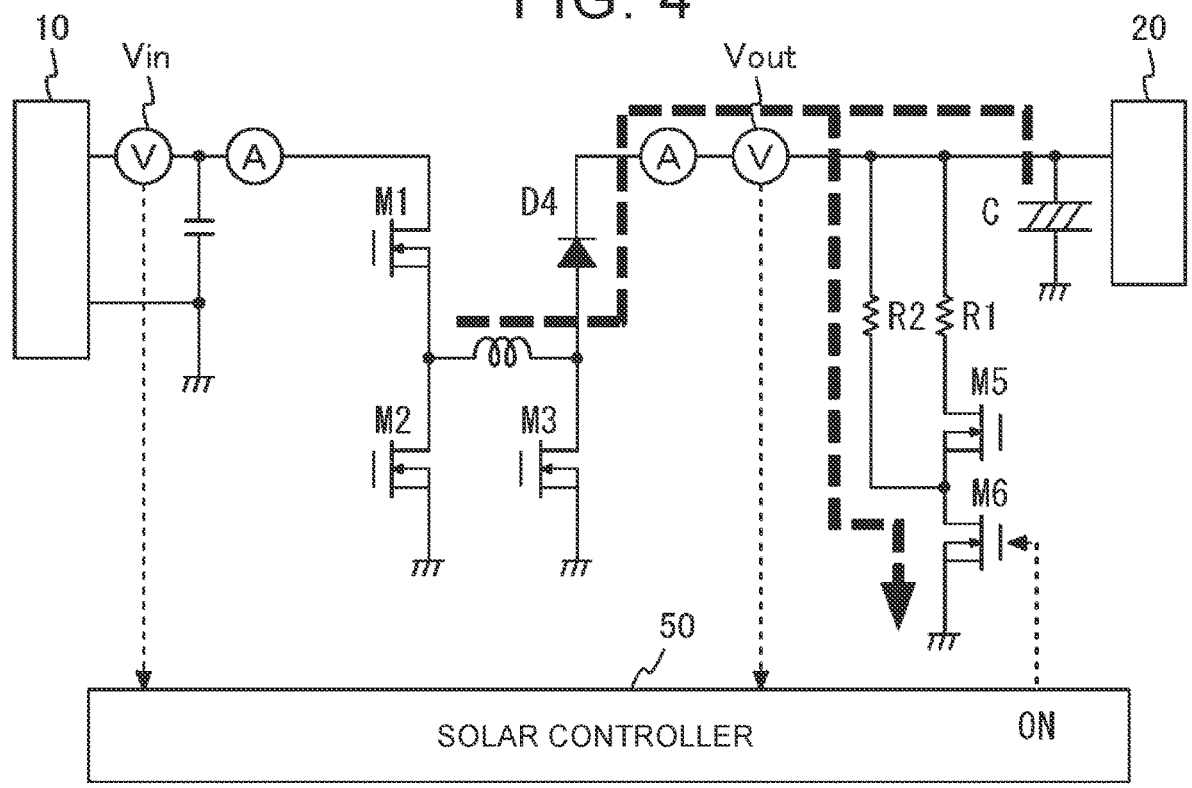
FIG. 4 is a diagram showing currents in the solar unit in a normal condition during the first abnormality determination process.
Figure 5:
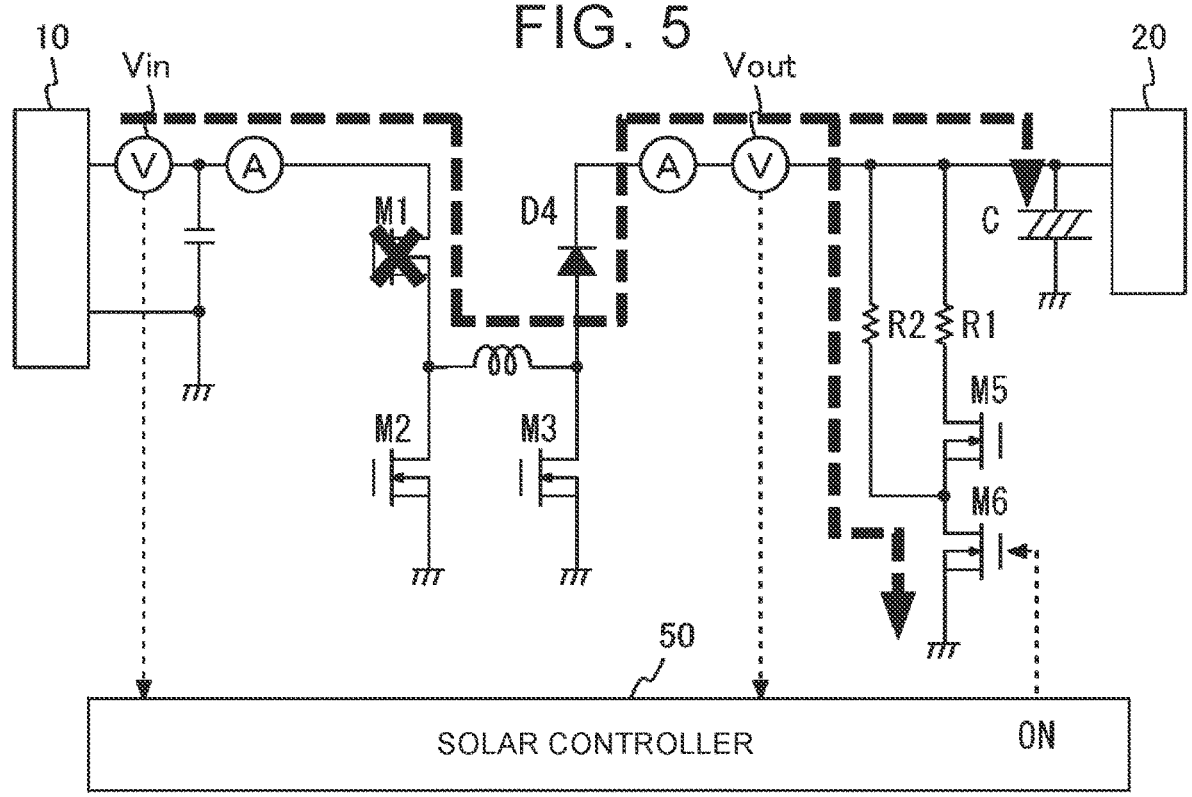
FIG. 5 is a diagram showing currents in the solar unit in an abnormal condition during the first abnormality determination process.

FIG. 2 is a flowchart illustrating a first abnormality determination process that is executed by the solar controller 50. FIG. 3 is a table showing the statuses of the switching elements of the solar DDC 30 and the regulator circuit 40 that are controlled in the first abnormality determination process. FIG. 4 is a diagram showing the flow of current when the switching element M1 is normal in the solar unit 1 during the first abnormality determination process. FIG. 5 is a diagram showing the flow of current when the switching element M1 is abnormal in the solar unit 1 during the first abnormality determination process.

Step S201

The solar controller 50 determines whether the input voltage of the solar DDC 30 is higher than or equal to a first threshold Vth1. This determination is performed to check whether the solar panel 10 is generating a sufficient amount of electric power to such an extent that abnormality determination is highly accurately performed (whether there is an amount of solar radiation greater than or equal to a predetermined amount). Thus, the first threshold Vth1 is able to be appropriately set based on a voltage required for the first abnormality determination process. When the input voltage of the solar DDC 30 is higher than or equal to the first threshold Vth1 (YES in step S201), the process proceeds to step S202. On the other hand, when the input voltage of the solar DDC 30 is lower than the first threshold Vth1 (NO in step S201), the first abnormality determination process ends.

Step S202

The solar controller 50 discharges electric power to decrease the middle point voltage (the output voltage of the solar DDC 30). In this middle point voltage discharging process, as shown in FIG. 3, a discharge path is formed by controlling each of the switching element M1 of the step-down upper arm, the switching element M2 of the step-down lower arm, and the switching element M3 of the step-up lower arm of the solar DDC 30 to an OFF state, controlling the switching element M5 of the regulator circuit 40 to an OFF state, and controlling the switching element M6 to an ON state. A current discharge path represented by the dashed arrow in FIG. 4 is formed by this control over the switching elements. When the middle point voltage discharging process has been executed, the process proceeds to step S203.

Step S203

The solar controller 50 determines whether a first period of time has elapsed from when the middle point voltage discharging process is executed. The determination is performed to reliably decrease the middle point voltage (the output voltage of the solar DDC 30) in the case where there is no open circuit fault of the step-down upper arm and the step-up upper arm. Thus, the first period of time may be set to a period of time required to decrease the maximum middle point voltage that can be taken by the solar DDC 30 in the solar unit 1 to a predetermined first voltage V1 (typically, zero). When the first period of time has elapsed (YES in S203), the process proceeds to step S204. On the other hand, when the first period of time has not elapsed yet (NO in step S203), the process proceeds to step S201.

Step S204

The solar controller 50 determines whether there is a short-circuit fault of (the switching element M1 of) the step-down upper arm of the solar DDC 30. This step-down upper arm short-circuit fault determination process is executed as follows in a state where, as shown in FIG. 3, as in the case of the middle point voltage discharging process, a discharge path of the middle point voltage is formed by controlling each of the switching element M1 of the step-down upper arm, the switching element M2 of the step-down lower arm, and the switching element M3 of the step-up lower arm of the solar DDC 30 to an OFF state, controlling the switching element M5 of the regulator circuit 40 to an OFF state, and controlling the switching element M6 to an ON state.

When the switching element M1 of the step-down upper arm is normal, no current flows between the source and the drain, so no current flows through the solar DDC 30 because of OFF control even when the solar panel 10 is generating electric power. Thus, after discharging electric power continuously for the first period of time, the middle point voltage detected by the output voltage detection unit Vout is substantially equal to zero. In contrast, when there is an abnormality that a short circuit occurs between the source and the drain in the switching element M1 of the step-down upper arm, current continuously flows from the solar panel 10 to the solar DDC 30 as shown in FIG. 5. Therefore, even when electric power is discharged continuously for the first period of time, the middle point voltage does not become zero and is substantially equal to the input voltage of the solar DDC 30. Therefore, the solar controller 50 determines whether there is a short-circuit fault of the step-down upper arm based on the following determination condition 1-1 or determination condition 1-2.

Determination Condition 1-1

When the absolute value of a difference between the input voltage of the solar DDC 30 (the detected value of the input voltage detection unit Vin) and the middle point voltage (the detected value of the output voltage detection unit Vout) is less than a second threshold Vth2 (mathematical expression (1)), the solar controller 50 determines that there is a short-circuit fault of the step-down upper arm. The second threshold Vth2 is set to a predetermined value obtained by adding a determination margin to zero.

$$|(\text{Input Voltage of Solar DDC}) - (\text{Middle Point Voltage})| < (\text{Second Threshold Vth2}) \quad (1)$$

Determination Condition 1-2

When the middle point voltage (the detected value of the output voltage detection unit Vout) exceeds a third threshold Vth3 (mathematical expression (2)), the solar controller 50 determines that there is a short-circuit fault of the step-down upper arm. The third threshold Vth3 is set to a value higher than the first voltage V1 to which the middle point voltage decreases as a result of the discharging process and lower than the first threshold Vth1 by which a sufficient amount of electric power generated by the solar panel 10 is determined.

$$(\text{Middle Point Voltage}) > (\text{Third Threshold Vth3}) \quad (2)$$

With the first abnormality determination process, before the solar charging system is activated and power generation and charging control is started, it is possible to determine a short-circuit fault of the step-down upper arm of the solar DDC 30. Thus, it is possible to avoid a situation in which the capacitor C fails due to an excessive increase in the middle point voltage (the output voltage of the solar DDC 30) (overvoltage at the middle point). When the solar panel 10 is not able to generate a sufficient amount of electric power, the first abnormality determination process is not started or is cancelled even after the start of the first abnormality determination process, so it is possible to prevent erroneous determination as to whether there is a short-circuit fault of the step-down upper arm.

(2) Second Abnormality Determination Process

Figures 6, 7:
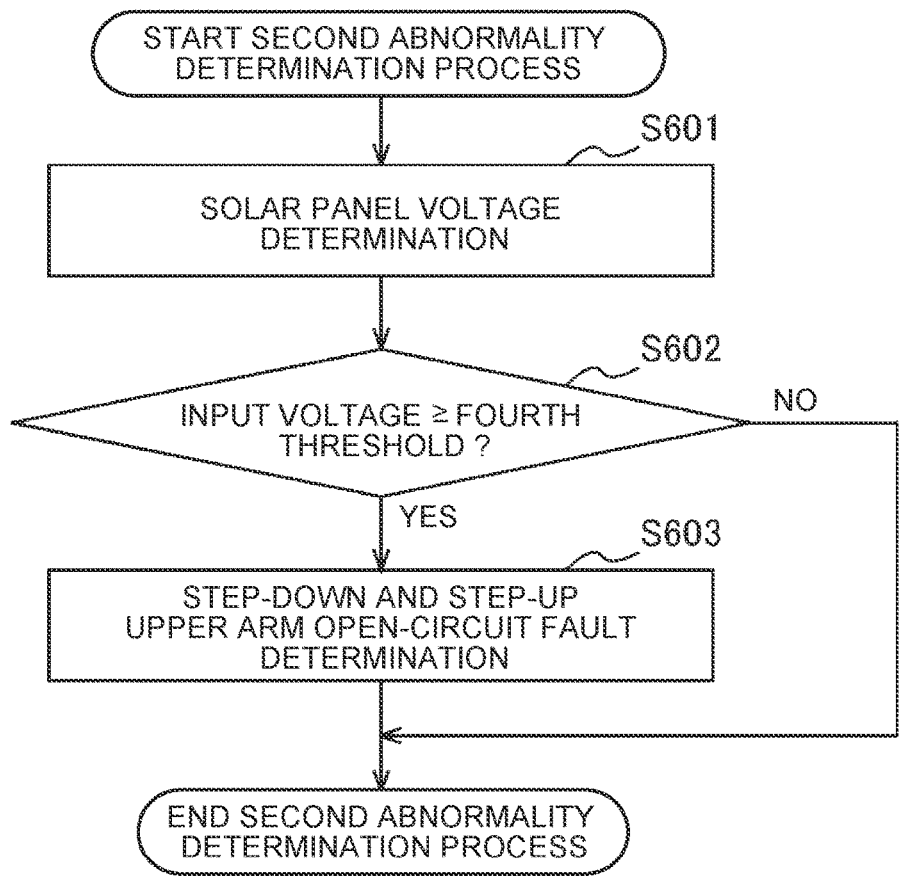
FIG. 6 is a flowchart illustrating a second abnormality determination process that is executed by the solar controller.
FIG. 7 is a table showing the statuses of the switching elements of the solar DDC and the regulator circuit in the second abnormality determination process.
Figure 8:
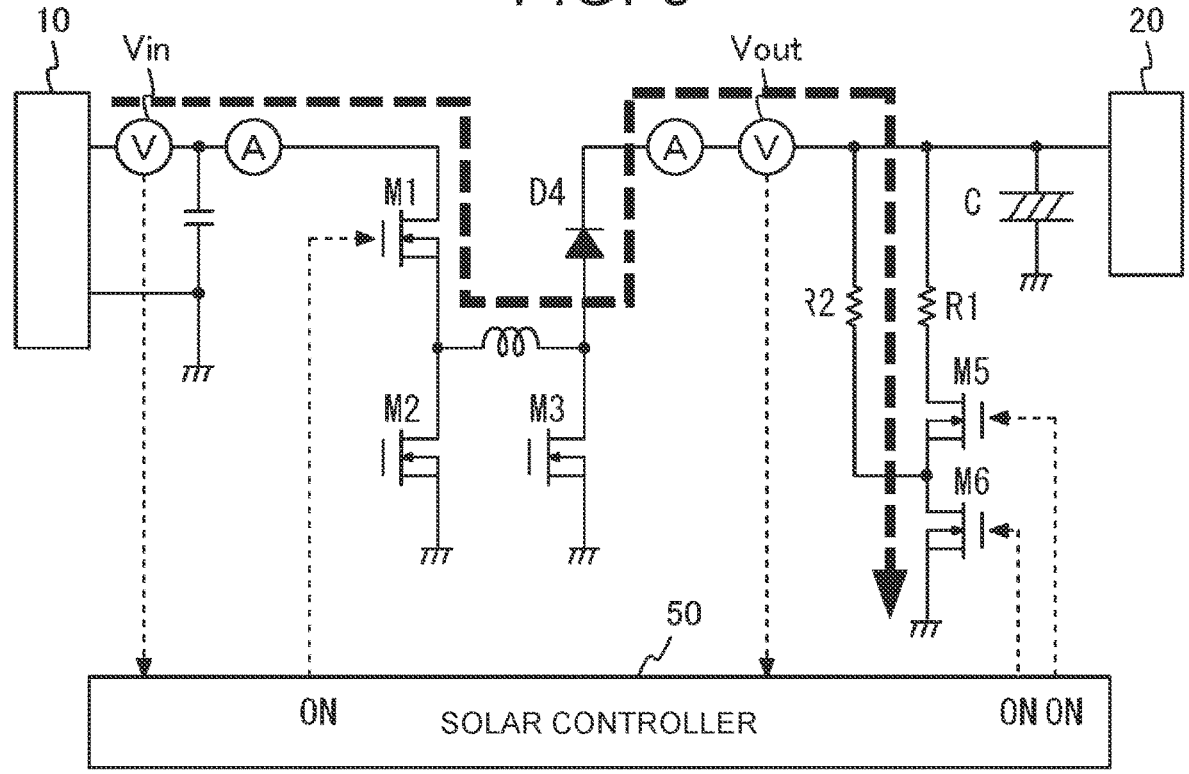
FIG. 8 is a diagram showing currents in the solar unit in a normal condition during the second abnormality determination process.
Figure 9A:
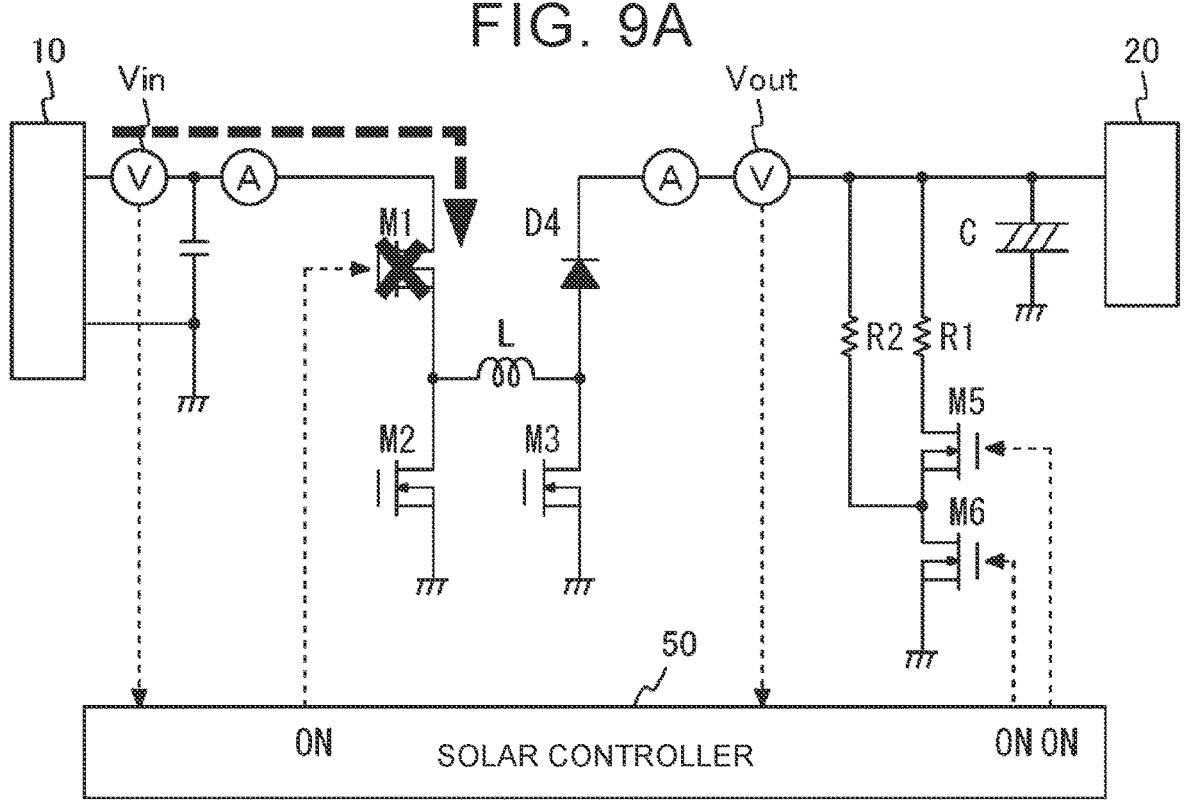
FIG. 9A is a diagram showing currents in the solar unit in an abnormal condition during the second abnormality determination process.
Figure 9B:
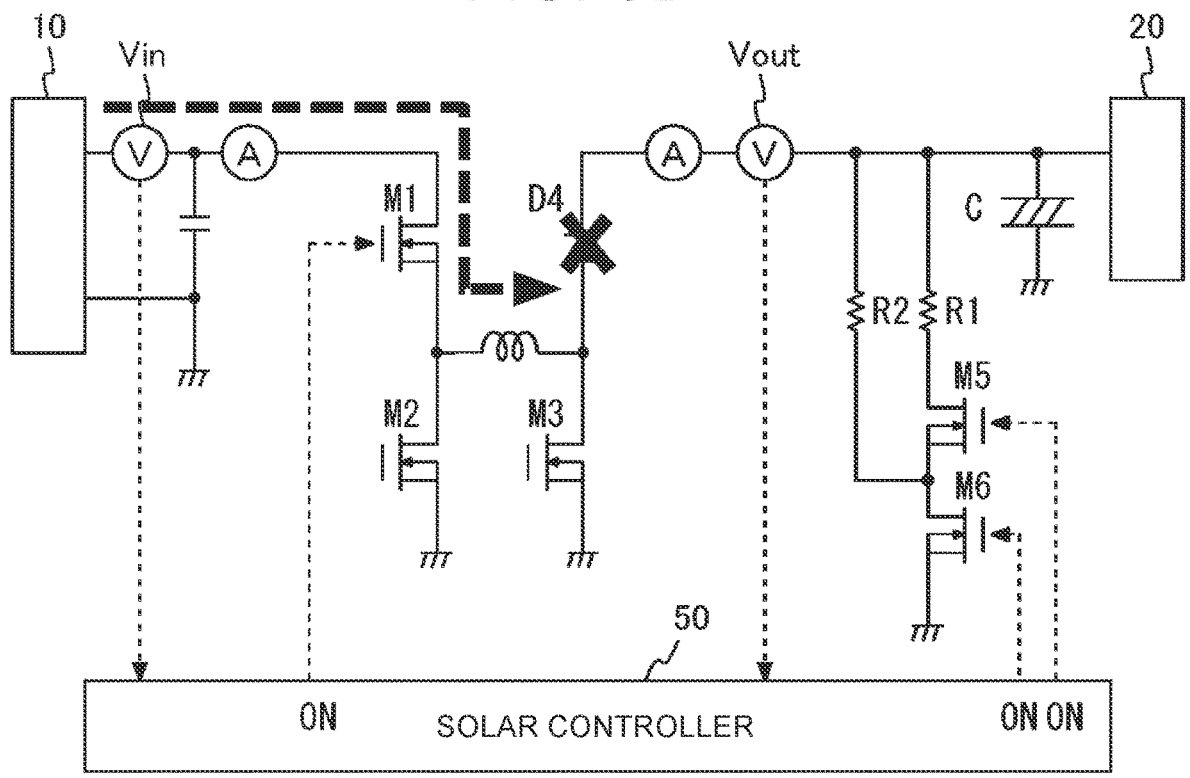
FIG. 9B is a diagram showing other currents in the solar unit in an abnormal condition during the second abnormality determination process.

FIG. 6 is a flowchart illustrating a second abnormality determination process that is executed by the solar controller 50. FIG. 7 is a table showing the statuses of the switching elements of the solar DDC 30 and the regulator circuit 40 that are controlled in the second abnormality determination process. FIG. 8 is a diagram showing the flow of current when the switching element M1 and the rectifier element D4 both are normal in the solar unit 1 during the second abnormality determination process. FIG. 9A and FIG. 9B are diagrams showing the flow of current when the switching element M1 or the rectifier element D4 is abnormal in the solar unit 1 during the second abnormality determination process.

Step S601

The solar controller 50 performs solar panel voltage determination to check whether the solar panel 10 is generating a sufficient amount of electric power (whether there is an amount of solar radiation greater than or equal to a predetermined amount) to such an extent that abnormality determination is highly accurately performed. In this solar panel voltage determination process, as shown in FIG. 7, a short-circuit path is formed by controlling each of the switching element M1 of the step-down upper arm, the switching element M2 of the step-down lower arm, and the switching element M3 of the step-up lower arm of the solar DDC 30 to an OFF state and controlling each of the switching element M5 and the switching element M6 of the regulator circuit 40 to an ON state. As a result of control over the switching elements, the solar DDC 30 is not in operation, and the output voltage of the solar panel 10, that is, the input voltage of the solar DDC 30, is able to be detected and acquired. When the solar panel voltage determination process is executed, the process proceeds to step S602.

Step S602

When the input voltage of the solar DDC 30 is able to be detected and acquired, the solar controller 50 determines whether the input voltage of the solar DDC 30 is higher than or equal to a fourth threshold Vth4. This determination is performed to check whether the solar panel 10 is generating a sufficient amount of electric power to such an extent that abnormality determination is highly accurately performed (whether there is an amount of solar radiation greater than or equal to a predetermined amount). Thus, the fourth threshold Vth4 is able to be appropriately set based on a voltage required for the second abnormality determination process. The fourth threshold Vth4 may be the same or may be different from the first threshold Vth1. When the input voltage of the solar DDC 30 is higher than or equal to the fourth threshold Vth4 (YES in step S602), the process proceeds to step S603. On the other hand, when the input voltage of the solar DDC 30 is lower the fourth threshold Vth4 (NO in step S602), the second abnormality determination process ends.

Step S603

The solar controller 50 determines whether there is an open circuit fault of (the switching element M1 of) the step-down upper arm and (the rectifier element D4 of) the step-up upper arm of the solar DDC 30. This step-down and step-up upper arm open circuit fault determination process is executed as follows in a state where a short-circuit path of the solar panel 10 is formed by controlling the switching element M1 of the step-down upper arm of the solar DDC 30 to an ON state, controlling each of the switching element M2 of the step-down lower arm and the switching element M3 of the step-up lower arm to an OFF state, and controlling each of the switching element M5 and the switching element M6 of the regulator circuit 40 to an ON state.

When the switching element M1 of the step-down upper arm and the rectifier element D4 of the step-up upper arm both are normal, short-circuit current flows from the solar panel 10 as shown in FIG. 8, so the input voltage of the solar DDC 30 is substantially equal to zero based on the I-V characteristics of the solar panel 10. In contrast, when there is an open-circuit abnormality in the switching element M1 of the step-down upper arm, no current flows between the source and the drain as shown in FIG. 9A, so the input voltage of the solar DDC 30 is an open-circuit voltage (maximum value) based on the I-V characteristics of the solar panel 10. When there is an open-circuit abnormality in the step-up upper arm, that is, the rectifier element D4, no current flows to the output side of the solar DDC 30 as shown in FIG. 9B, so the input voltage of the solar DDC 30 is an open-circuit voltage based on the I-V characteristics of the solar panel 10. Therefore, the solar controller 50 determines whether there is an open circuit fault of the step-down upper arm and the step-up upper arm based on the following determination condition 2.

Determination Condition 2

When the input voltage of the solar DDC 30 (the detected value of the input voltage detection unit Vin) exceeds a fifth threshold Vth5 (mathematical expression (3)), the solar controller 50 determines that there is an open circuit fault of at least one of the step-down upper arm and the step-up upper arm. The fifth threshold Vth5 is set to a predetermined value higher than zero and lower than the fourth threshold Vth4.

(Input Voltage of Solar DDC)>(Fifth Threshold Vth5)　　　(3)

With the second abnormality determination process, before the solar charging system is activated and power generation and charging control is started, it is possible to determine an open circuit fault of the step-down upper arm or step-up upper arm of the solar DDC 30. Thus, it is possible to recognize a situation in which charging control using electric power generated by the solar panel 10 is not possible. When the solar panel 10 is not able to generate a sufficient amount of electric power, the second abnormality determination process is not started, so it is possible to prevent erroneous determination as to whether there is an open circuit fault of the step-down upper arm and the step-up upper arm.

(3) Third Abnormality Determination Process

Figure 10:
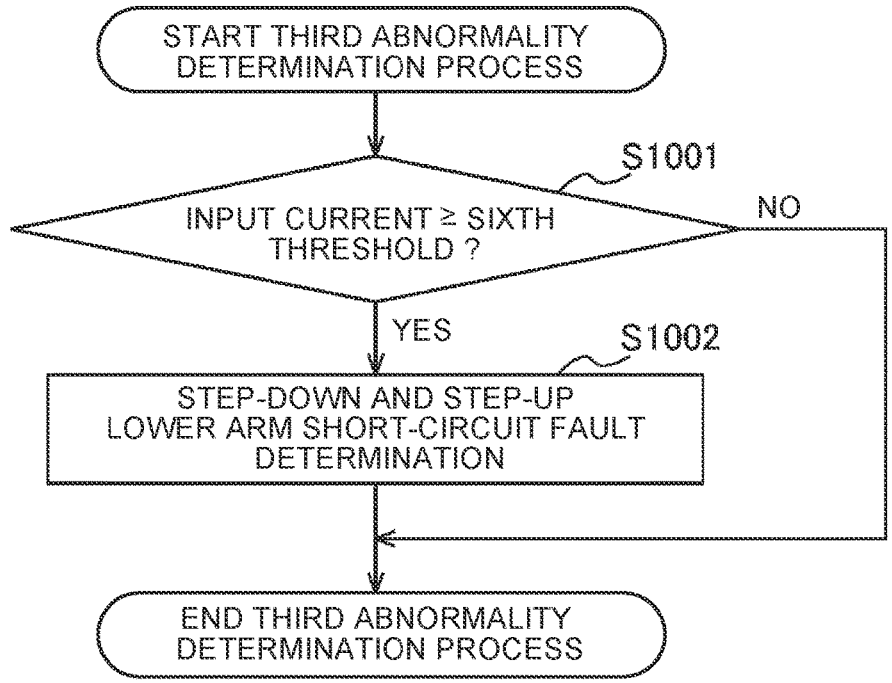
FIG. 10 is a flowchart illustrating a third abnormality determination process that is executed by the solar controller.
Figures 11, 12:
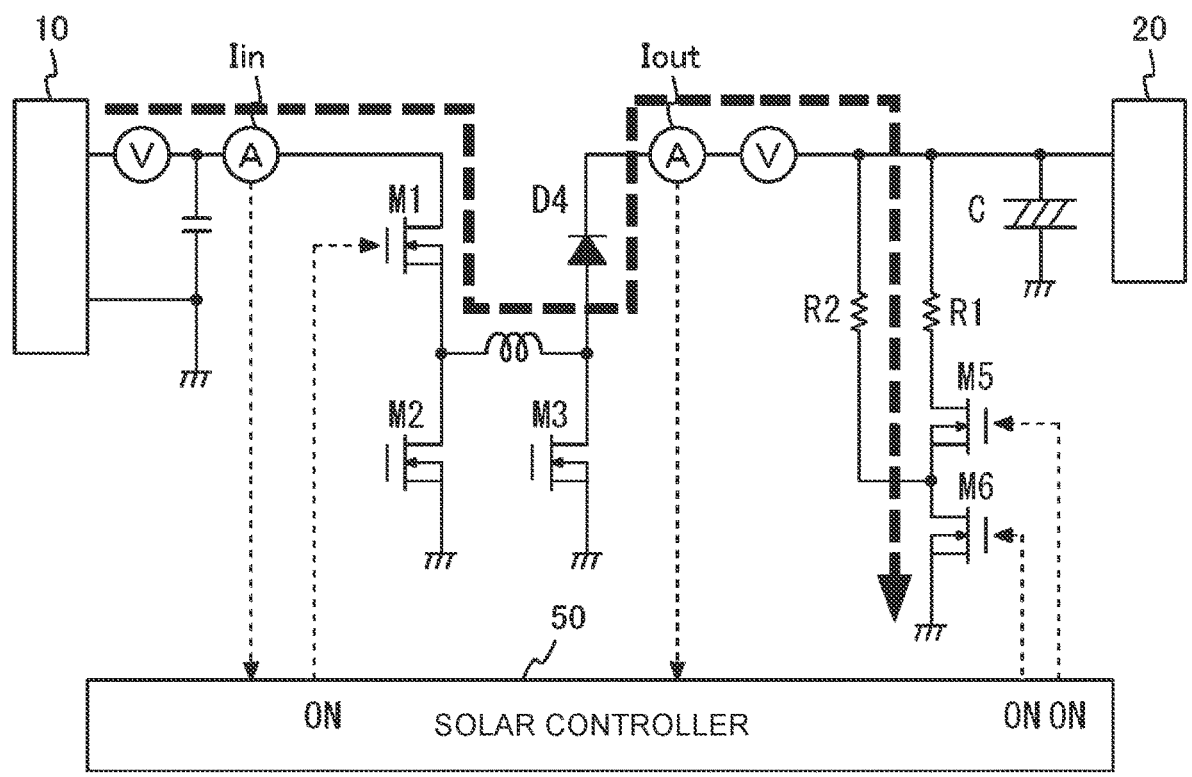
FIG. 11 is a table showing the statuses of the switching elements of the solar DDC and the regulator circuit in the third abnormality determination process.
FIG. 12 is a diagram showing currents in the solar unit in a normal condition during the third abnormality determination process.
Figure 13A:
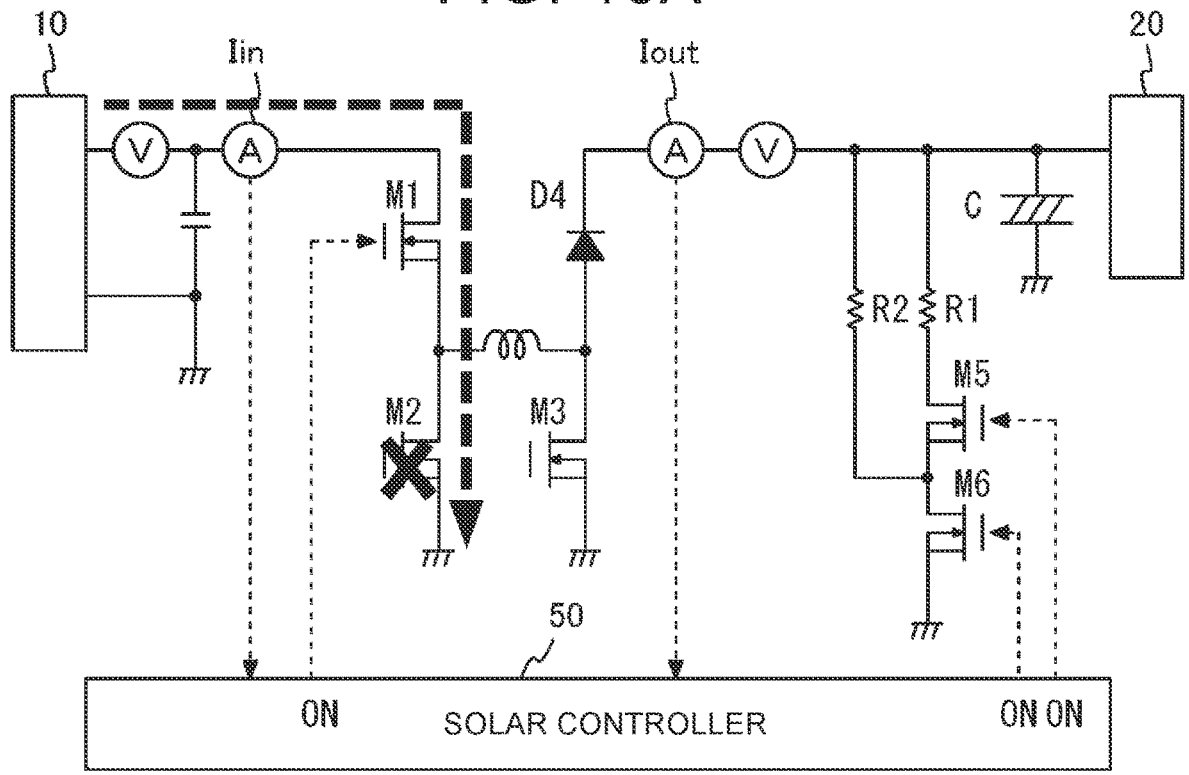
FIG. 13A is a diagram showing currents in the solar unit in an abnormal condition during the third abnormality determination process.
Figure 13B:
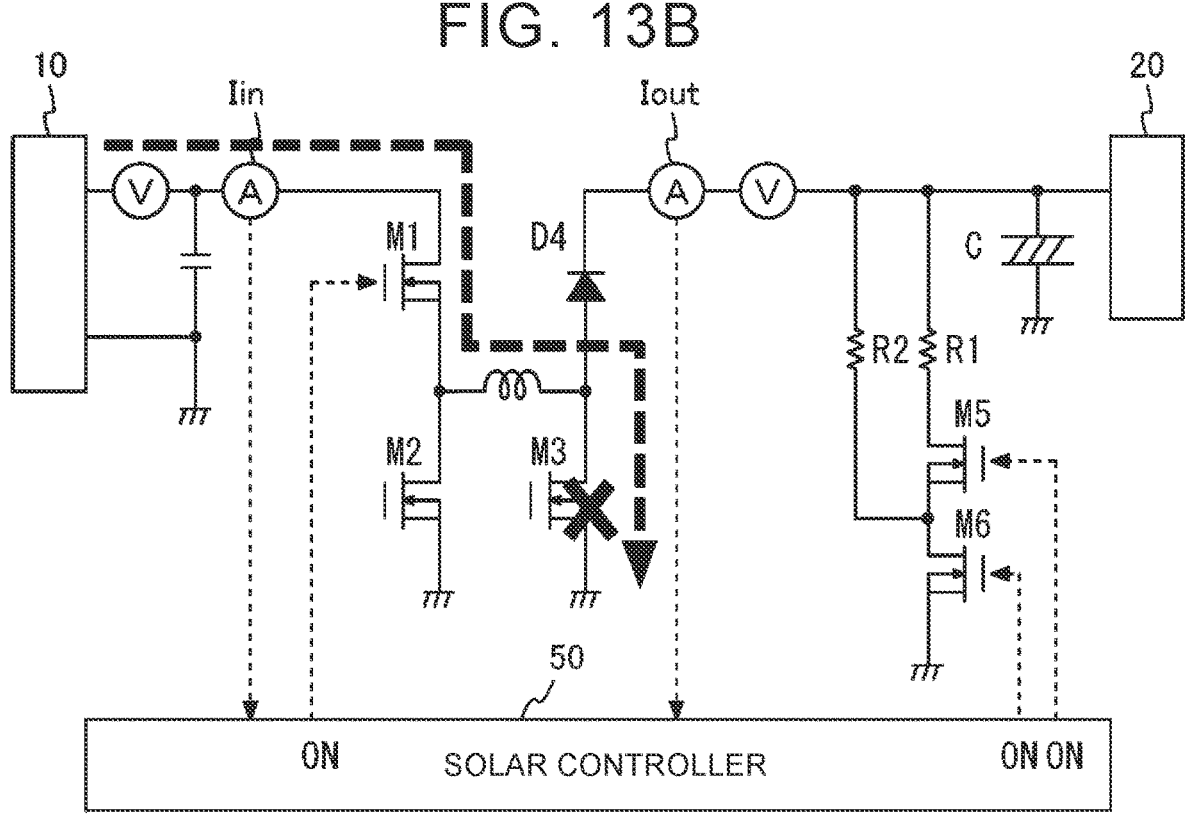
FIG. 13B is a diagram showing other currents in the solar unit in an abnormal condition during the third abnormality determination process.

FIG. 10 is a flowchart illustrating a third abnormality determination process that is executed by the solar controller 50. FIG. 11 is a table showing the statuses of the switching elements of the solar DDC 30 and the regulator circuit 40 that are controlled in the third abnormality determination process. FIG. 12 is a diagram showing the flow of current when the switching element M2 and the switching element M3 are normal in the solar unit 1 during the third abnormality determination process. FIG. 13A and FIG. 13B are diagrams showing the flow of current when the switching element M2 or the switching element M3 is abnormal in the solar unit 1 during the third abnormality determination process.

Step S1001

The solar controller 50 determines whether the input current of the solar DDC 30 is greater than or equal to a sixth threshold Ith6. This determination is performed to check whether the solar panel 10 is generating a sufficient amount of electric power to such an extent that abnormality determination is highly accurately performed (whether there is an amount of solar radiation greater than or equal to a predetermined amount). Thus, the sixth threshold Ith6 is able to be appropriately set based on a current required for the third abnormality determination process. When the input current of the solar DDC 30 is greater than or equal to the sixth threshold Ith6 (YES in step S1001), the process proceeds to step S1002. On the other hand, when the input current of the solar DDC 30 is less than the sixth threshold Ith6 (NO in step S1001), the third abnormality determination process ends.

Step S1002

The solar controller 50 determines whether there is a short-circuit fault of (the switching element M2 of) the step-down lower arm and (the switching element M3 of) the step-up lower arm of the solar DDC 30. This step-down lower arm and step-up lower arm short-circuit fault determination process is executed as follows in a state where, as shown in FIG. 11, a short-circuit path is formed by controlling the switching element M1 of the step-down upper arm of the solar DDC 30 to an ON state, controlling each of the switching element M2 of the step-down lower arm and the switching element M3 of the step-up lower arm to an OFF state, and controlling each of the switching element M5 and the switching element M6 of the regulator circuit 40 to an ON state.

When the switching element M2 of the step-down lower arm and the switching element M3 of the step-up lower arm both are normal, short-circuit current flows from the solar panel 10 toward the regulator circuit 40 as shown in FIG. 12, so the input current and the output current of the solar DDC 30 are equal to the short-circuit current of the solar panel 10. In contrast, when there is a short-circuit abnormality in the switching element M2 of the step-down lower arm, no short-circuit current flows toward the output side of the solar DDC 30 as shown in FIG. 13A. When there is a short-circuit abnormality in the switching element M3 of the step-up lower arm, no short-circuit current flows toward the output side of the solar DDC 30 as shown in FIG. 13B. Therefore, the solar controller 50 determines whether there is a short-circuit fault of the step-down lower arm and the step-up lower arm based on the following determination condition 3-1 or determination condition 3-2.

Determination Condition 3-1

When the absolute value of a difference between the input current of the solar DDC 30 (the detected value of the input current detection unit Iin) and the output current of the solar DDC 30 (the detected value of the output current detection unit Iout) exceeds a seventh threshold Ith7 (mathematical expression 4), the solar controller 50 determines that there is a short-circuit fault of at least one of the step-down lower arm and the step-up lower arm. The seventh threshold Ith7 is set to a predetermined value greater than zero and less than the sixth threshold Ith6.

$$|(\text{Input Current of Solar DDC}) - (\text{Output Current of Solar DDC})| > (\text{Seventh Threshold Ith7}) \quad (4)$$

Determination Condition 3-2

When the output current of the solar DDC 30 (the detected value of the output current detection unit Tout) is less than an eighth threshold Ith8 (mathematical expression 5), the solar controller 50 determines that there is a short-circuit fault of at least one of the step-down lower arm and the step-up lower arm. The eighth threshold Ith8 is set to a predetermined value obtained by adding a determination margin (sensor error or the like) to zero.

$$(\text{Output Current of Solar DDC}) < (\text{Eighth Threshold Ith8}) \quad (5)$$

With the third abnormality determination process, before the solar charging system is activated and power generation and charging control is started, it is possible to determine a short-circuit fault of the step-down lower arm or step-up lower arm of the solar DDC 30. Thus, it is possible to recognize a situation in which charging control using electric power generated by the solar panel 10 is not possible. When the solar panel 10 is not able to generate a sufficient amount of electric power, the third abnormality determination process is not started, so it is possible to prevent erroneous determination as to whether there is a short-circuit fault of the step-down lower arm and the step-up lower arm.

(4) Fourth Abnormality Determination Process

Figure 16:
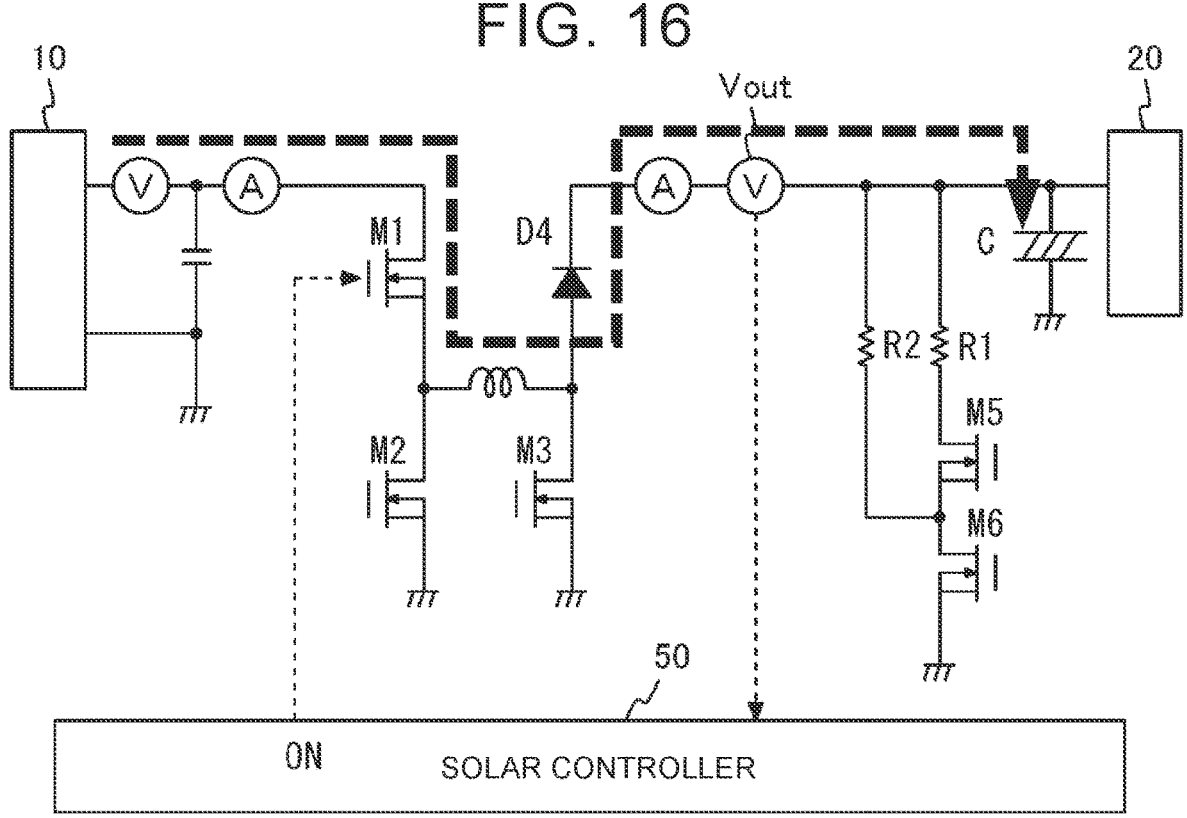
FIG. 16 is a diagram showing currents in the solar unit in a normal condition during the fourth abnormality determination process.
Figure 17:
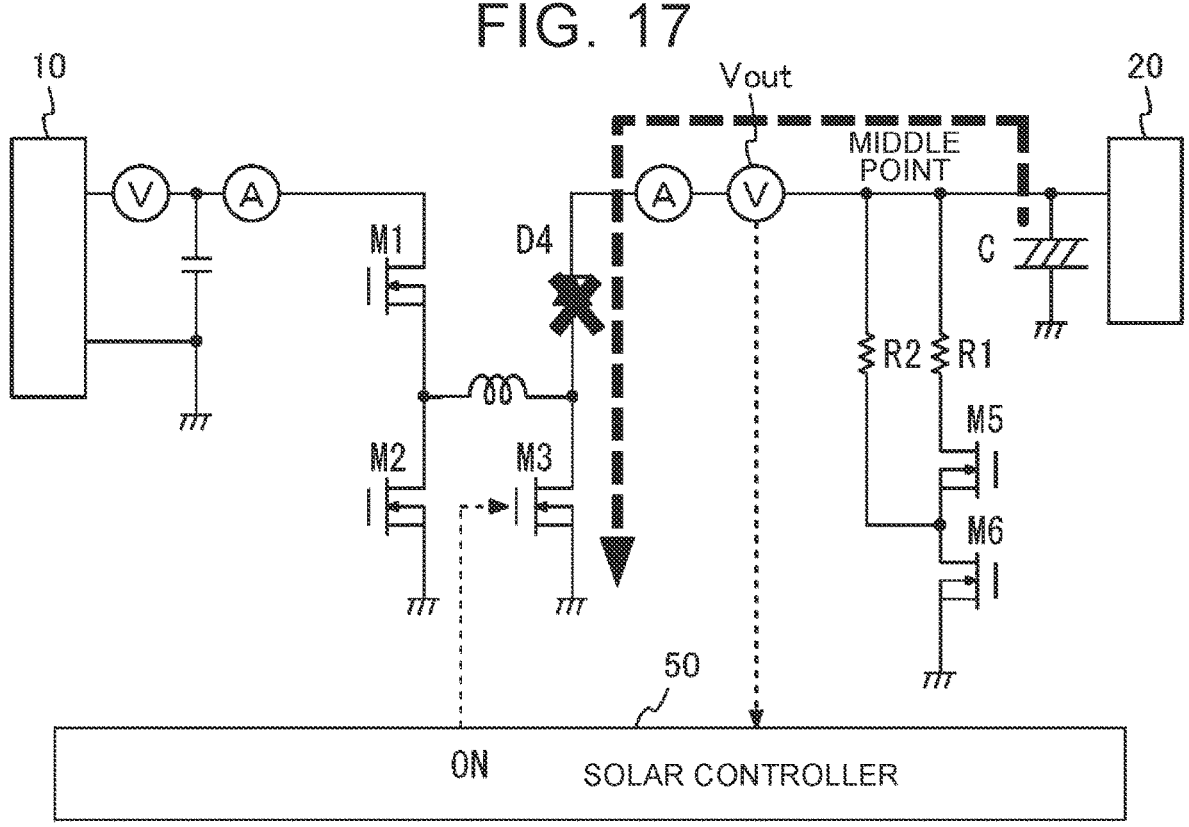
FIG. 17 is a diagram showing currents in the solar unit in an abnormal condition during the fourth abnormality determination process.

FIG. 14 is a flowchart illustrating a fourth abnormality determination process that is executed by the solar controller 50. FIG. 15 is a table showing the statuses of the switching elements of the solar DDC 30 and the regulator circuit 40 that are controlled in the fourth abnormality determination process. FIG. 16 is a diagram showing the flow of current when the rectifier element D4 is normal in the solar unit 1 during the fourth abnormality determination process. FIG. 17 is a diagram showing the flow of current when the rectifier element D4 is abnormal in the solar unit 1 during the fourth abnormality determination process.

Step S1401

The solar controller 50 executes a process of precharging the voltage at the middle point at which the solar DDC 30 and the output circuit 20 are connected (the output voltage of the solar DDC 30). In this middle point voltage precharge process, as shown in FIG. 15, the switching element M1 of the step-down upper arm of the solar DDC 30 is controlled to an ON state, each of the switching element M2 of the step-down lower arm and the switching element M3 of the step-up lower arm is controlled to an OFF state, and each of the switching element M5 and the switching element M6 of the regulator circuit 40 is controlled to an OFF state. A charging path from the solar panel 10 to the capacitor C as represented by the dashed arrow in FIG. 16 is formed by this control over the switching elements. When the middle point voltage precharge process has been executed, the process proceeds to step S1402.

Step S1402

The solar controller 50 determines whether the middle point voltage (the output voltage of the solar DDC 30) is a voltage higher than or equal to a ninth threshold Vth9 and it is shorter than or equal to a second period of time (a second period of time has not elapsed). This determination is performed to check whether the fourth abnormality determination is able to be performed. Thus, the ninth threshold Vth9 is set to a predetermined value lower than or equal to a voltage to be normally stored in the capacitor C. When the middle point voltage is a voltage higher than or equal to the ninth threshold Vth9 (YES in step S1402), the process proceeds to step S1403. On the other hand, when the middle point voltage is lower than the ninth threshold Vth9 (NO in step S1402), the fourth abnormality determination process ends. In this case, it is considered that the solar panel 10 is not generating a sufficient amount of electric power to such an extent that a precharge process is able to be completed (there is not an amount of solar radiation greater than or equal to a predetermined amount).

Step S1403

The solar controller 50 determines whether there is a short-circuit fault of (the rectifier element D4 of) the step-up upper arm of the solar DDC 30. This step-up upper arm short-circuit fault determination process is executed as follows by controlling each of the switching element M1 of the step-down upper arm and the switching element M2 of the step-down lower arm of the solar DDC 30 to an OFF state, controlling the switching element M3 of the step-up lower arm to an ON state, and controlling each of the switching element M5 and the switching element M6 of the regulator circuit 40 to an OFF state.

When there is no short-circuit fault of the rectifier element D4 of the step-up upper arm, there is no path to discharge electric charge stored in the capacitor C, so the middle point voltage (the output voltage of the solar DDC 30) remains substantially at a precharged voltage (only a decrease in voltage due to natural discharge). In contrast, when there is a short-circuit fault of the rectifier element D4 of the step-up upper arm, current flows between the cathode and anode of the rectifier element D4 as shown in FIG. 17, so electric charge stored in the capacitor C is discharged through the switching element M3 of the step-up lower arm. For this reason, the middle point voltage is substantially equal to zero. Therefore, the solar controller 50 determines whether there is a short-circuit fault of the step-up upper arm based on the following determination condition 4.

Determination Condition 4

When the middle point voltage (the detected value of the output voltage detection unit Vout) is lower than a tenth threshold Vth10 (mathematical expression (6)), the solar controller 50 determines that there is a short-circuit fault of the step-up upper arm. The tenth threshold Vth10 is set to a predetermined value higher than zero and lower than the ninth threshold Vth9.

$$\text{(Middle Point Voltage)} < \text{(Tenth Threshold Vth10)} \quad (6)$$

With the fourth abnormality determination process, before the solar charging system is activated and power generation and charging control is started, it is possible to determine a short-circuit fault of the step-up upper arm of the solar DDC 30. Thus, it is possible to avoid a situation in which the solar panel 10 fails without normal output control over the solar panel 10. When the capacitor C is not able to be precharged with a sufficient amount of electric charge (the amount of electric power generated by the solar panel 10 is insufficient), the fourth abnormality determination process is not started, so it is possible to prevent erroneous determination as to whether there is a short-circuit fault of the step-up upper arm.

First Modification

Figure 18:
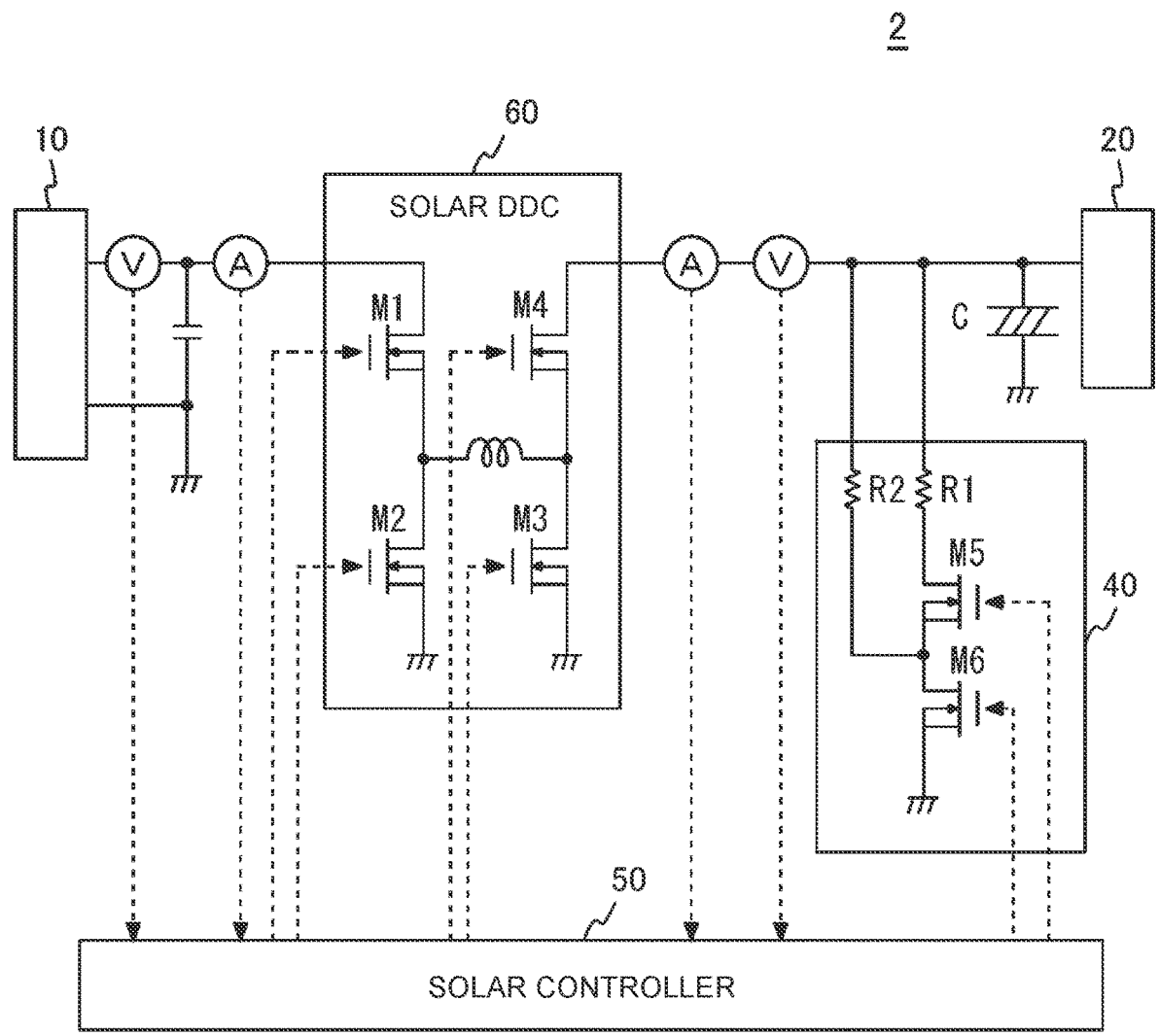
FIG. 18 is a diagram showing the schematic configuration of a solar unit including a solar DDC of a first modification.

FIG. 18 is a diagram showing the schematic configuration of a solar unit including a solar DDC 60 of a first modification. The solar DDC 60 of the first modification shown in FIG. 18 is configured such that, in the solar DDC 30 shown in FIG. 1, the rectifier element D4 of the step-up upper arm is replaced with a switching element M4. In the case of the configuration in which the switching element M4, such as an FET, is used as the step-up upper arm, the first to fourth abnormality determination processes are able to be executed by the rectification of a body diode (not shown) formed in the FET by constantly controlling the switching element M4 to an OFF state. FIG. 19 is a table showing the statuses of the switching elements of the solar DDC 60 of the first modification and the regulator circuit 40 that are controlled in each of the first to fourth abnormality determination processes.

Second Modification

Figure 20:
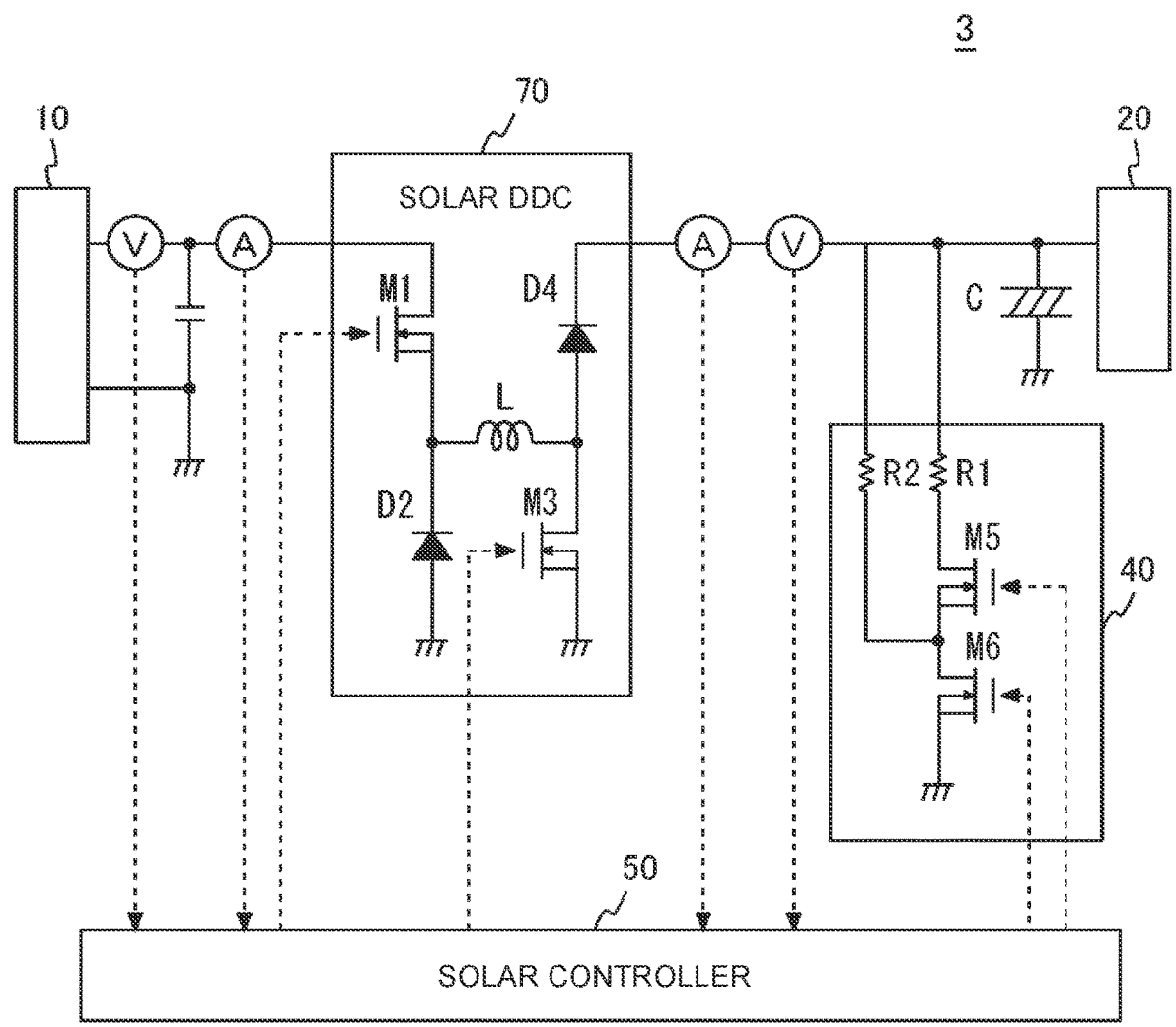
FIG. 20 is a diagram showing the schematic configuration of a solar unit including a solar DDC of a second modification.

FIG. 20 is a diagram showing the schematic configuration of a solar unit 3 including a solar DDC 70 of a second modification. The solar DDC 70 of the second modification shown in FIG. 20 is configured such that, in the solar DDC 30 shown in FIG. 1, the switching element M2 of the step-down lower arm is replaced with a rectifier element D2. In the case of the configuration in which the rectifier element D2, such as a diode, is used as the step-down lower arm, the rectifier element D2 functions as in the case where the switching element M2 is constantly controlled to an OFF state, so it is possible to execute the first to fourth abnormality determination processes. FIG. 21 is a table showing the statuses of the switching elements of the solar DDC 70 of the second modification and the regulator circuit 40 that are controlled in each of the first to fourth abnormality determination processes.

Application Example

Figure 22:
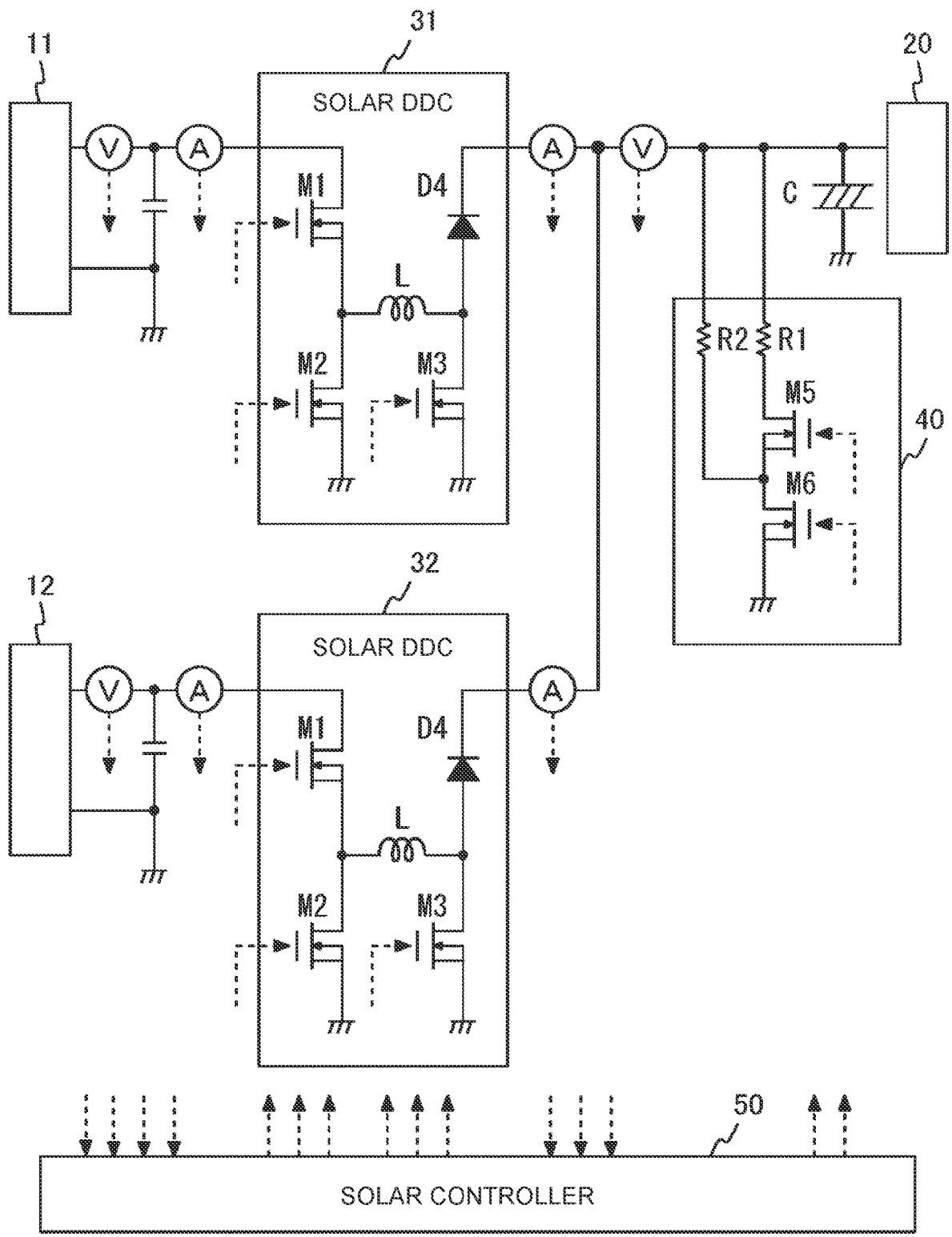
FIG. 22 is a diagram showing the schematic configuration of a solar unit of an application example.

FIG. 22 is a diagram showing the schematic configuration of a solar unit 4 of an application example. The solar unit 4 of the application example shown in FIG. 22 differs from the configuration of the solar unit 1 illustrated in FIG. 1 in that a first solar panel 11 and a second solar panel 12 and a first solar DDC 31 and a second solar DDC 32 provided in correspondence with the first solar panel 11 and the second solar panel 12 are provided. Each of the first solar DDC 31 and the second solar DDC 32 includes a voltage detection unit and a current detection unit at the input side and an output current detection unit at the output side. With the configuration of the solar unit 4 that includes two lines of solar panel and solar DDC, as shown in FIG. 23, a short-circuit fault and an open circuit fault of upper and lower arms in each of the first solar DDC 31 and the second solar DDC 32 is able to be determined by executing the first to fourth abnormality determination processes while cooperatively executing ON/OFF switching control between the switching elements M1, M2, M3 that make up the first solar DDC 31 and the switching elements M1, M2, M3 that make up the second solar DDC 32.

In the solar unit 4 of the application example, when the regulator circuit 40 is provided in each of the first solar DDC 31 and the second solar DDC 32, it is possible to independently execute the abnormality determination processes on each of the first solar DDC 31 and the second solar DDC 32.

Operation and Advantageous Effects

The solar controller according to the embodiment of the disclosure is capable of determining not only a short-circuit fault of each of the upper and lower arms, including the step-down upper arm, the step-down lower arm, the step-up upper arm, and the step-up lower arm that make up the DC-DC converter, but also an open circuit fault of the upper arms by using the values of the input and output voltages and input and output currents of the DC-DC converter and a large-capacitance capacitor connected to the middle point that is the output side of the DC-DC converter. Thus, it is possible to reduce occurrence of a fault in the solar panel and the large-capacitance capacitor and easily determine a state where electric power is not able to be generated by the solar panel.

The solar controller according to the embodiment of the disclosure determines whether the solar panel is generating a sufficient amount of electric power to such an extent that abnormality determination is able to be highly accurately performed and, only when a sufficient amount of electric power is being generated, determine whether there is a short-circuit fault or open circuit fault of each of the arms. Thus, it is possible to prevent erroneous determination as to whether there is a short-circuit fault or open circuit fault of arms when the amount of solar radiation is small.

The embodiment of the disclosure has been described; however, the disclosure is not limited to the solar controller. The disclosure may also be interpreted as a method that is executed by the solar controller, a program that implements the method, a non-transitory computer-readable storage medium that stores the program, a solar unit that includes the solar controller, a vehicle that includes the solar unit, or the like.

The solar controller of the disclosure is usable for a DC-DC converter or the like that is used in a solar charging system that charges a battery with electric power generated by a solar panel and is, more specifically, usable when, for example, it is intended to easily determine occurrence of a short-circuit fault or an open circuit fault.

What is claimed is:

1. A solar controller configured to control a solar unit, the solar unit including
   a solar panel,
   a DC-DC converter that is a step-up and step-down type and is configured to
      receive electric power generated by the solar panel,
      convert the received electric power to a predetermined electric power, and
      output the predetermined electric power, and
   a regulator circuit provided between an output of the DC-DC converter and a ground potential, the solar controller comprising one or more processors configured to:
      acquire an input voltage and an output voltage of the DC-DC converter;
      acquire an input current and an output current of the DC-DC converter;
      control the regulator circuit and a plurality of switching elements that respectively make up a plurality of arms included in the DC-DC converter;
      determine whether an abnormality in each of the arms has occurred based on i) the input voltage and the output voltage or ii) the input current and the output current, that are acquired, and
      when the input voltage of the DC-DC converter is higher than or equal to a first threshold, determine whether a short-circuit fault of a step-down upper arm of the DC-DC converter has occurred after maintaining, for a first period of time, a state where each of the switching element of the step-down upper arm, the switching element of a step-down lower arm, and the switching element of a step-up lower arm of the DC-DC converter is controlled to an OFF state and the regulator circuit is controlled to a discharge path.

2. The solar controller according to claim 1, wherein the one or more processors are configured to, when an absolute value of a difference between the input voltage and the output voltage of the DC-DC converter is less than a second threshold, determine that the short-circuit fault of the step-down upper arm has occurred.

3. The solar controller according to claim 1, wherein the one or more processors are configured to, when the output voltage of the DC-DC converter exceeds a third threshold, determine that the short-circuit fault of the step-down upper arm has occurred.

4. The solar controller according to claim 1, wherein the one or more processors are configured to, when the input voltage of the DC-DC converter is higher than or equal to a fourth threshold, determine whether an open circuit fault of a step-down upper arm and a step-up upper arm of the DC-DC converter has occurred, in a state where the switching element of the step-down upper arm is controlled to an ON state, each of the switching element of a step-down lower arm and the switching element of a step-up lower arm of the DC-DC converter is controlled to an OFF state, and the regulator circuit is controlled to a short-circuit path.

5. The solar controller according to claim 4, wherein the one or more processors are configured to, when the input voltage of the DC-DC converter exceeds a fifth threshold, determine that the open circuit fault of at least one of the step-down upper arm and the step-up upper arm has occurred.

6. The solar controller according to claim 1, wherein the one or more processors are configured to, when the input current of the DC-DC converter is greater than or equal to a sixth threshold, determine whether a short-circuit fault of a step-down lower arm and a step-up lower arm of the DC-DC converter has occurred, in a state where the switching element of a step-down upper arm of the DC-DC converter is controlled to an ON state, each of the switching element of the step-down lower arm and the switching element of the step-up lower arm is controlled to an OFF state, and the regulator circuit is controlled to a short-circuit path.

7. The solar controller according to claim 6, wherein the one or more processors are configured to, when an absolute value of a difference between the input current and the output current of the DC-DC converter exceeds a seventh threshold, determine that the short-circuit fault of at least one of the step-down lower arm and the step-up lower arm has occurred.

8. The solar controller according to claim 6, wherein the one or more processors are configured to, when the output current of the DC-DC converter is less than an eighth threshold, determine that the short-circuit fault of at least one of the step-down lower arm and the step-up lower arm has occurred.

9. The solar controller according to claim 1, wherein:
   the solar unit further includes a capacitor connected to the output of the DC-DC converter and capable of storing electric power; and
   the one or more processors are configured to, when the output voltage of the DC-DC converter is higher than or equal to a ninth threshold in a state where the switching element of a step-down upper arm of the DC-DC converter is controlled to an ON state, each of the switching element of a step-down lower arm and the switching element of a step-up lower arm of the DC-DC converter is controlled to an OFF state, and the regulator circuit is controlled to be open, determine whether a short-circuit fault of a step-up upper arm of the DC-DC converter has occurred, in a state where each of the switching element of the step-down upper arm and the switching element of the step-down lower arm is controlled to an OFF state, the switching element of the step-up lower arm is controlled to an ON state, and the regulator circuit is controlled to be open.

10. The solar controller according to claim 9, wherein the one or more processors are configured to, when the output voltage of the DC-DC converter is lower than a tenth threshold, determine that the short-circuit fault of the step-up upper arm has occurred.

11. A vehicle comprising the solar controller according to claim 1.

12. A method that is executed by a solar controller configured to control a solar unit including a solar panel, a DC-DC converter that is a step-up and step-down type and is configured to receive electric power generated by the solar panel, convert the received electric power to a predetermined electric power, and output the predetermined electric power, and a regulator circuit provided between an output of the DC-DC converter and a ground potential, the method comprising:
 acquiring input and output voltages of the DC-DC converter;
 acquiring input and output currents of the DC-DC converter;
 controlling the regulator circuit and a plurality of switching elements that respectively make up a plurality of arms included in the DC-DC converter;
 determining whether an abnormality in each of the arms has occurred based on the input and output voltages or the input and output currents; and
 when the input voltage of the DC-DC converter is higher than or equal to a first threshold, determining whether a short-circuit fault of a step-down upper arm of the DC-DC converter has occurred after maintaining, for a first period of time, a state where each of the switching element of the step-down upper arm, the switching element of a step-down lower arm, and the switching element of a step-up lower arm of the DC-DC converter is controlled to an OFF state and the regulator circuit is controlled to a discharge path.

13. A non-transitory storage medium storing instructions that are executable by a computer of a solar controller and cause the computer to perform functions, the solar controller being configured to control a solar unit including a solar panel, a DC-DC converter that is a step-up and step-down type and is configured to receive electric power generated by the solar panel, convert the received electric power to a predetermined electric power, and output the predetermined electric power, and a regulator circuit provided between an output of the DC-DC converter and a ground potential, the functions comprising:
 acquiring input and output voltages of the DC-DC converter;
 acquiring input and output currents of the DC-DC converter;
 controlling the regulator circuit and a plurality of switching elements that respectively make up a plurality of arms included in the DC-DC converter;
 determining whether an abnormality in each of the arms has occurred based on the input and output voltages or the input and output currents; and
 when the input voltage of the DC-DC converter is higher than or equal to a first threshold, determining whether a short-circuit fault of a step-down upper arm of the DC-DC converter has occurred after maintaining, for a first period of time, a state where each of the switching element of the step-down upper arm, the switching element of a step-down lower arm, and the switching element of a step-up lower arm of the DC-DC converter is controlled to an OFF state and the regulator circuit is controlled to a discharge path.

* * * * *